(12) United States Patent
Rodrigues

(10) Patent No.: US 12,146,833 B2
(45) Date of Patent: Nov. 19, 2024

(54) CHIRAL SENSING WITH HARMONIC GENERATION FROM A METASURFACE FABRICATED ON A SOI WAFER

(71) Applicants: Toyota Motor Engineering & Manufacturing North America, Inc., Plano, TX (US); Toyota Jidosha Kabushiki Kaisha, Aichi-ken (JP)

(72) Inventor: Sean P. Rodrigues, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi (JP)

( * ) Notice: Subject to any disclaimer, the term of this patent is extended or adjusted under 35 U.S.C. 154(b) by 221 days.

(21) Appl. No.: 18/046,601

(22) Filed: Oct. 14, 2022

(65) Prior Publication Data
US 2024/0133812 A1    Apr. 25, 2024

(51) Int. Cl.
*G01N 21/64* (2006.01)
*G01N 21/01* (2006.01)
*G01N 21/21* (2006.01)

(52) U.S. Cl.
CPC ......... *G01N 21/6486* (2013.01); *G01N 21/01* (2013.01); *G01N 21/21* (2013.01)

(58) Field of Classification Search
CPC ..... G01N 21/01; G01N 21/21; G01N 21/6486
See application file for complete search history.

(56) References Cited

U.S. PATENT DOCUMENTS

| 4,818,899 | A  | * | 4/1989  | Tiers ...................... G02F 1/3612 252/582 |
| 6,545,739 | B1 | * | 4/2003  | Matsumoto ........ G02B 6/29358 349/198 |
| 11,460,620 | B1 | * | 10/2022 | Chen ..................... G02B 5/3083 |

(Continued)

FOREIGN PATENT DOCUMENTS

CN        108897088 B        11/2018

OTHER PUBLICATIONS

Yoo et al., "Metamaterials and chiral sensing; a review of fundamentals and applications", Nanophotonics 2019; 8(2):249-261pp, published by De Gruyter.

*Primary Examiner* — Blake C Riddick
(74) *Attorney, Agent, or Firm* — Jordan IP Law, LLC

(57) ABSTRACT

A system for use with a randomly dispersed chiral organic solution. The system includes: an infrared laser that outputs a light beam having a wavelength in an IR spectrum; a stage that holds the randomly dispersed chiral organic solution, the stage being arranged to receive the light beam from the infrared laser, the stage including a silicon-on-insulator (SOI) resonating cavity structure configured to generate chiral signals in a linear IR regime, the stage being configured to generate a second harmonic optical signal from the light beam, the second harmonic optical signal being in an ultraviolet (UV) spectrum, the stage being configured to output the second harmonic optical signal; a UV detector that can receive the second harmonic optical signal from the stage; and an analyzer being configured to determine a chiroptical signature for the randomly dispersed chiral organic solution based on the received second harmonic optical signal.

20 Claims, 12 Drawing Sheets

(56) References Cited

U.S. PATENT DOCUMENTS

| | | | | |
|---|---|---|---|---|
| 2003/0090658 | A1* | 5/2003 | Zhu | G01N 21/211 |
| | | | | 356/369 |
| 2005/0094144 | A1* | 5/2005 | Gibbs | G01N 21/21 |
| | | | | 356/365 |
| 2006/0001876 | A1* | 1/2006 | Gibbs | G01N 21/21 |
| | | | | 356/364 |
| 2011/0273708 | A1* | 11/2011 | Tong | G01N 21/3504 |
| | | | | 356/311 |
| 2015/0157246 | A1* | 6/2015 | Leszinske | G01N 21/21 |
| | | | | 600/316 |
| 2015/0233820 | A1* | 8/2015 | Roke | G01N 21/636 |
| | | | | 356/338 |
| 2015/0323445 | A1* | 11/2015 | Rakitzis | G01J 4/04 |
| | | | | 356/367 |
| 2016/0041095 | A1* | 2/2016 | Rothberg | G01N 21/6452 |
| | | | | 506/4 |
| 2017/0315050 | A1* | 11/2017 | Rakitzis | G01N 21/21 |
| 2017/0363472 | A1* | 12/2017 | Abdulhalim | G02F 1/1393 |
| 2018/0138661 | A1* | 5/2018 | Liang | H01S 5/0092 |
| 2018/0306723 | A1* | 10/2018 | Ashrafi | G01N 33/49 |
| 2020/0080937 | A1* | 3/2020 | Chanda | G01N 21/19 |
| 2020/0232907 | A1* | 7/2020 | Pearl, Jr. | E21B 49/0875 |
| 2022/0018759 | A1* | 1/2022 | Phal | G01N 21/23 |
| 2022/0115095 | A1* | 4/2022 | Cohen | G16C 20/30 |
| 2022/0120670 | A1* | 4/2022 | Neufeld | G01N 21/21 |
| 2022/0364982 | A1* | 11/2022 | Dionne | G01N 21/21 |
| 2023/0266291 | A1* | 8/2023 | Myrick | H10K 30/00 |
| 2024/0077409 | A1* | 3/2024 | Lin | G01N 21/27 |

* cited by examiner

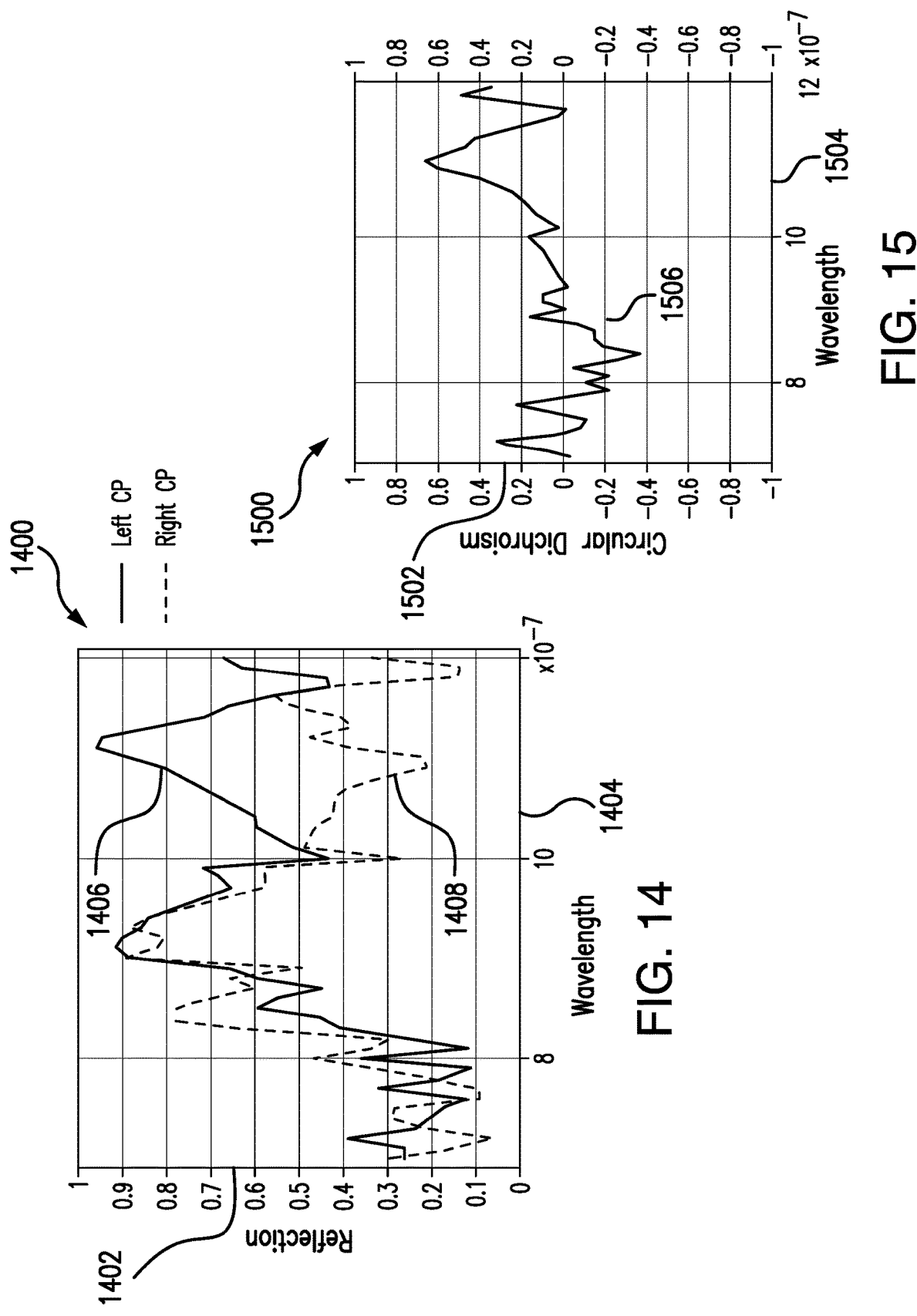

CHIRAL SENSING WITH HARMONIC GENERATION FROM A METASURFACE FABRICATED ON A SOI WAFER

BACKGROUND

Embodiments relate to chiral sensing for analyzing analytes.

SUMMARY

An aspect of the present disclosure is drawn to a system for use with a randomly dispersed chiral organic solution. The system includes an infrared (IR) laser configured to output a light beam having a wavelength in an IR spectrum; a stage configured to hold the randomly dispersed chiral organic solution, the stage being arranged to receive the light beam from the IR laser, the stage including a silicon-on-insulator (SOI) resonating cavity structure configured to generate chiral signals in a linear IR regime, the stage being configured to generate a second harmonic optical signal from the light beam, the second harmonic optical signal being in an ultraviolet (UV) spectrum, the stage being configured to output the second harmonic optical signal; a UV detector being arranged to receive the second harmonic optical signal from the stage; and an analyzer being configured to determine a chiroptical signature for the randomly dispersed chiral organic solution based on the received second harmonic optical signal.

In some embodiments of this aspect, the IR laser includes a tunable IR laser configured to output a first light beam of a first wavelength in the IR spectrum at a first time and to output a second light beam of a second wavelength in the IR spectrum at a second time.

In some embodiments of this aspect, the system further includes: a second UV detector being arranged to receive a third harmonic optical signal from the stage, wherein the stage is additionally configured to generate a third harmonic optical signal from the light beam, the third harmonic optical signal being in the UV spectrum, the stage being configured to output the third harmonic optical signal, and wherein the analyzer is further configured to determine the chiroptical signature for the randomly dispersed chiral organic solution based additionally on the received third harmonic optical signal.

In some embodiments of this aspect, the system further includes: an IR detector being arranged to receive an IR optical signal from the stage, wherein the analyzer is further configured to determine the chiroptical signature for the randomly dispersed chiral organic solution based additionally on the received IR optical signal.

In some embodiments of this aspect, the system further includes: a voltage source, wherein the stage includes an array of unit cells, wherein each unit cell includes: a silicon handle; a silicon electrode; a silicon dioxide ($SiO_2$) layer disposed between the silicon handle and the silicon electrode; and an electrode separated from the silicon electrode, and wherein the voltage source is configured to generate a bias between the silicon electrode and the electrode so as to generate an electric field between the silicon electrode and the electrode so as to elucidate an orientation of a susceptibility tensor of the randomly dispersed chiral organic solution. In some of these embodiments, the array of unit cells includes a first unit cell and a second unit cell, and the voltage source is configured to generate a first bias having a first polarity between a first silicon electrode and a first electrode of the first unit cell so as to generate a first electric field between the first silicon electrode and the first electrode and is configured to generate a second bias having a second polarity, that is opposite to the first polarity, between a second silicon electrode and a second electrode of the second unit cell so as to generate a second electric field between the second silicon electrode and the second electrode.

In some embodiments of this aspect, the system further includes a controlled polarizer configured to polarize the light beam into a right circular polarization at a first time and to polarize the light beam into a left circular polarization at a second time.

A second aspect of the present disclosure is drawn to a method of analyzing a randomly dispersed chiral organic solution. The method includes: outputting, via an infrared (IR) laser, a light beam having a wavelength in an IR spectrum; receiving, via a stage configured to hold the randomly dispersed chiral organic solution, the light beam from the IR laser, the stage including a SOI resonating cavity structure configured to generate chiral signals in a linear IR regime; generating, via the stage, a second harmonic optical signal from the light beam, the second harmonic optical signal being in an ultraviolet or visible (UV) spectrum; outputting, via the stage, the second harmonic optical signal; receiving, via a UV detector, the second harmonic optical signal from the stage; and determining, via an analyzer, a chiroptical signature for the randomly dispersed chiral organic solution based on the received second harmonic optical signal.

In some embodiments of the second aspect, the outputting, via the IR laser, the light beam having the wavelength in an IR spectrum includes: outputting, via a tunable IR laser, a first light beam of a first wavelength in the IR spectrum at a first time; and outputting, via the tunable IR laser, a second light beam of a second wavelength in the IR spectrum at a second time.

In some embodiments of the second aspect, the method further includes: generating, via the stage; a third harmonic optical signal from the light beam, the third harmonic optical signal being in the UV spectrum; outputting, via the stage, the third harmonic optical signal; and receiving, via a second detector, a third harmonic optical signal from the stage, wherein the determining, via the analyzer, the chiroptical signature for the randomly dispersed chiral organic solution based on the received second harmonic optical signal includes determining the chiroptical signature for the randomly dispersed chiral organic solution based additionally on the received third harmonic optical signal.

In some embodiments of the second aspect, the method further includes: receiving, via an IR detector, an IR optical signal from the stage, wherein the determining, via the analyzer, the chiroptical signature for the randomly dispersed chiral organic solution based on the received second harmonic optical signal includes determining the chiroptical signature for the randomly dispersed chiral organic solution based additionally on the received IR optical signal.

In some embodiments of the second aspect, the method further includes: generating, via a voltage source, a bias, wherein the stage includes an array of unit cells, wherein each unit cell includes: a silicon handle; a silicon electrode; an $SiO_2$ layer disposed between the silicon handle and the silicon electrode; and an electrode separated from the silicon electrode, and wherein the generating, via a voltage source, a bias includes generating the bias between the silicon electrode and the electrode so as to generate an electric field between the silicon electrode and the electrode so as to elucidate an orientation of a susceptibility tensor of the randomly dispersed chiral organic solution. In some of these embodiments, the generating, via a voltage source, a bias includes generating a first bias and generating a second bias, wherein the array of unit cells includes a first unit cell and a second unit cell, and wherein the generating the first bias includes generating the first bias having a first polarity between a first silicon electrode and a first electrode of the first unit cell so as to generate a first electric field between the first silicon electrode and the first electrode, and wherein the generating the second bias includes generating is configured to generate the second bias having a second polarity, that is opposite to the first polarity, between a second silicon electrode and a second electrode of the second unit cell so as to generate a second electric field between the second silicon electrode and the second electrode.

In some embodiments of the second aspect, the method further includes: polarizing, via a controlled polarizer, the light beam into a right circular polarization at a first time; and polarizing, via the controlled polarizer, the light beam into a left circular polarization at a second time.

A third aspect of the present disclosure is drawn to a non-transitory, computer-readable media having computer-readable instructions stored thereon, the computer-readable instructions being capable of being read by a controller for use with an infrared (IR) laser, a stage, a UV detector, an analyzer, and a randomly dispersed chiral organic solution, wherein the computer-readable instructions are capable of instructing the controller to perform the method including: instructing, via a processor configured to execute instructions stored in a memory, the IR laser to output a light beam having a wavelength in an IR spectrum, so as to cause the stage holding the randomly dispersed chiral organic solution therein, to receive the light beam from the IR laser, the stage including a SOI resonating cavity structure configured to generate chiral signals in a linear IR regime, so as to cause the stage to generate a second harmonic optical signal from the light beam, the second harmonic optical signal being in an ultraviolet (UV) spectrum and to output the second harmonic optical signal; and instructing, via the processor, an analyzer to determine a chiroptical signature for the randomly dispersed chiral organic solution based on the second harmonic optical signal.

In some embodiments of the third aspect, the computer-readable instructions are capable of instructing the companion device to perform the method, wherein the outputting, via the IR laser, the light beam having the wavelength in an IR spectrum includes: outputting, via a tunable IR laser, a first light beam of a first wavelength in the IR spectrum at a first time; and outputting, via the tunable IR laser, a second light beam of a second wavelength in the IR spectrum at a second time.

In some embodiments of the third aspect, the computer-readable instructions are capable of instructing the companion device to perform the method: wherein the instructing, via the processor, the IR laser to output the light beam having the wavelength in an IR spectrum, so as to cause the stage holding the randomly dispersed chiral organic solution therein, to generate, via the stage a third harmonic optical signal from the light beam, the third harmonic optical signal being in the UV spectrum, so as to output the third harmonic optical signal, and wherein the instructing, via the processor, the analyzer to determine the chiroptical signature for the randomly dispersed chiral organic solution based on the second harmonic optical signal includes instructing the analyzer to determine the chiroptical signature for the randomly dispersed chiral organic solution based additionally on the received third harmonic optical signal.

In some embodiments of the third aspect, the computer-readable instructions are capable of instructing the companion device to perform the method wherein the instructing, via the processor, the analyzer to determine the chiroptical signature for the randomly dispersed chiral organic solution based on the second harmonic optical signal includes instructing via the analyzer to determine the chiroptical signature for the randomly dispersed chiral organic solution based on additionally on a received IR optical signal.

In some embodiments of the third aspect, the computer-readable instructions are capable of instructing the companion device to perform the method further comprising: instructing, via the processor, a voltage source to generate a bias, wherein the stage includes an array of unit cells, wherein each unit cell includes: a silicon handle; a silicon electrode; an $SiO_2$ layer disposed between the silicon handle and the silicon electrode; and an electrode separated from the silicon electrode, wherein the generating, via a voltage source, a bias includes generating the bias between the silicon electrode and the electrode so as to generate an electric field between the silicon electrode and the electrode so as to elucidate an orientation of a susceptibility tensor of the randomly dispersed chiral organic solution. In some of these embodiments, the computer-readable instructions are capable of instructing the companion device to perform the method wherein the instructing, via the processor, a voltage source to generate a bias, includes generating a first bias and generating a second bias, wherein the array of unit cells includes a first unit cell and a second unit cell, wherein the generating the first bias includes generating the first bias having a first polarity between a first silicon electrode and a first electrode of the first unit cell so as to generate a first electric field between the first silicon electrode and the first electrode, and wherein the generating the second bias includes generating is configured to generate the second bias having a second polarity, that is opposite to the first polarity, between a second silicon electrode and a second electrode of the second unit cell so as to generate a second electric field between the second silicon electrode and the second electrode.

BRIEF SUMMARY OF THE DRAWINGS

The accompanying drawings, which are incorporated in and form a part of the specification, illustrate example embodiments and, together with the description, serve to explain the principles of the embodiments. In the drawings:

FIG. 14 illustrates a graph of wavelength versus reflections to illustrate left polarization and right circular polarization in a linear optical regime of the chiral sensing system of FIG. 4A;

FIG. 15 illustrates a graph of wavelength versus reflections to illustrate circular dichroism in a linear optical regime of the graph of FIG. 14;

DETAILED DESCRIPTION

Chiral photonic devices have shown to increase chiroptical signals from molecular analytes. Chiroptical signals in this disclosure are those resulting from circular dichroism or optical rotatory dispersion. In particular, circular dichroism is when a material has an optical property, e.g., reflection or transmission, that is a function of the light's circular polarity. In other words, some solutions of molecular analytes will reflect a different amount of light (or transmit different amount of light) based on whether the incident light is right circularly polarized or left circularly polarized. Still further, this difference in transmission/reflection is also a function of the wavelength of the light. As such, each chiral molecular analyte will have a respective circular dichroism signature over a frequency band. An analyte may be identified by subjecting it to right and left circularly polarized light over the known frequency band to obtain its circular dichroism signature.

Related chiral photonic analyzing systems operate with a laser source operating in the ultraviolet (UV) spectrum.

A prior art chiral sensing system will now be described with reference to FIGS. 1-3.

Figure 1:
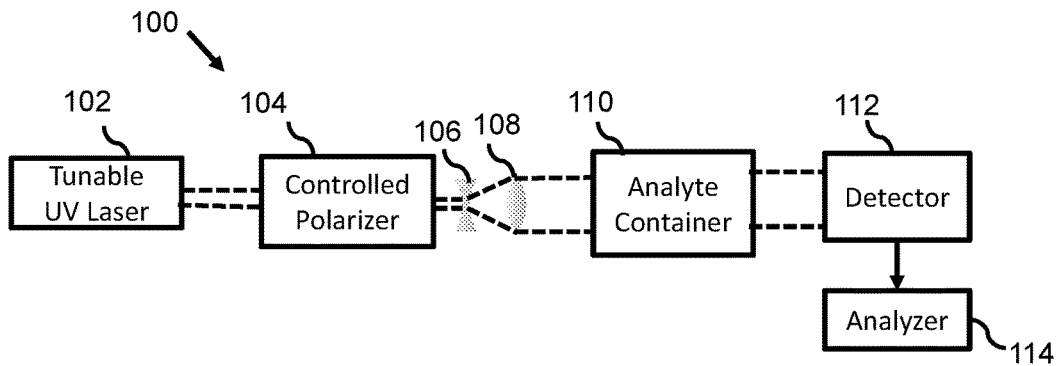
FIG. 1 illustrates a prior art chiral sensing system for analyzing analytes.

FIG. 1 illustrates a prior art chiral sensing system 100 for analyzing analytes.

As shown in the figure, prior art chiral sensing system 100 includes a tunable UV laser 102, a controlled polarizer 104, a beam expanding lens 106, a collimating lens 108, an analyte container 110, a detector 112 and an analyzer 114.

Tunable UV laser 102 may be any known light source or systems that is configured to output a coherent light beam in the UV spectrum. Further, tunable UV laser 102 is configured to tune the output coherent light beam from one frequency in the UV spectrum to another frequency in the UV spectrum, thereby spanning a predetermined bandwidth.

Controlled polarizer 104 may be any device or system that is configured to receive UV coherent light from tunable UV laser 102 and output the UV coherent light as a righthand circular polarized light beam in a first state or to output the UV coherent light as a lefthand circular polarized light beam in a second state.

Beam expanding lens 106 is illustrated as a single lens for purposes of brevity. It should be known that beam expanding lens 106 may be any lens or lens system that is configured to expand the beam width of the coherent light from controlled polarizer 104 to a beam width that coincides with detector 112, as will be described in greater detail below.

Collimating lens 108 is illustrated as a single lens for purposes of brevity. It should be known that collimating lens 108 may be any lens or lens system that is configured to collimate the expanding beam of the coherent light from beam expanding lens 106.

Analyte container 110 may be any device or system that is configured to hold an analyte to be analyzed and that permits the coherent light from collimating lens 108 to transmit therethrough.

Detector 112 is arranged to receive the collimated coherent light that has transmitted through analyte container 110. Detector 112 may be any device or system that is configured to detect an amount of light transmitted through analyte container 110. This will be described in greater detail with reference to FIG. 2.

Figure 2:
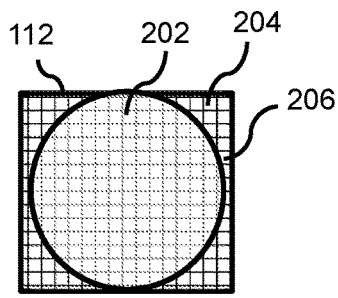
FIG. 2 illustrates a planar view of a detector of the prior art chiral sensing system of FIG. 1.

FIG. 2 illustrates a planar view of detector 112 of prior art chiral sensing system 100.

As shown in the figure, detector 112 includes an array of detecting cells, a sample of which are indicated as detecting cell 202 and detecting cell 204. A circle 206 represents a cross section of a beam of UV coherent light that is incident on detector 112. The portion of the detecting cells in which UV coherent light is incident will detect an amount of UV coherent light, such as detecting cell 202. However, a portion of detecting cells in which UV coherent light is not incident will not detect an amount of UV coherent light, such as detecting cell 204.

Returning to FIG. 1, in operation, tunable UV laser 102 is first set to a beginning wavelength in the UV spectrum. Controller polarizer 104 is set to either right-circularly polarize or left-circularly polarize the coherent light from tunable UV laser 102. The controller polarizer 104 is typically composed of a linear polarizer and a quarter waveplate rotated at such a wavelength to create a circularly polarized wave. The polarized UV light is expanded by beam expanding lens 106 to a width associated with the size of detector 112 and smaller than the analyte container 110, as shown in FIG. 2.

Returning to FIG. 1, collimating lens 108 then collimates the polarized UV light to pass through analyte container 110. The analyte within analyte container 110 will effect the transmission of the polarized UV light in some manner. The light is then detected by detector 112.

This process is repeated, wherein tunable UV laser 102 sweeps through many wavelengths in the UV spectrum.

Then, controlled polarizer 104 is switched to polarize the UV light from UV laser 102 in an opposite manner, and detections are again made for the same wavelengths in the UV spectrum.

Analyzer 114 subtracts the right-circularly polarized values from corresponding left-circularly polarized values for all the tested wavelengths to generate a dichroic signature of the analyte.

Figure 3:
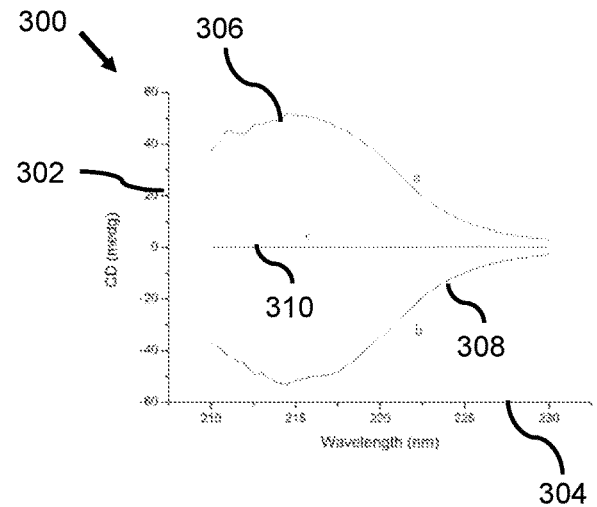
FIG. 3 illustrates a graph of a chiral signature of an analyte that is analyzed by the prior art chiral sensing system of FIG. 1.

FIG. 3 illustrates a graph 300 of a chiral signature of an analyte that is analyzed by the prior art chiral sensing system 100.

As shown in the figure, graph 300 includes a y-axis 302 of circular dichroism (CD), an x-axis 304 of the detected wavelength in nanometers, a function 306, a function 308, and a function 310. CD is defined by equation (1) below:

$$CD = T_{RCP} - T_{LCP}, \quad (1)$$

where $T_{RCP}$ is the amount of right circularly polarized light that is transmitted through the sample, and $T_{LCP}$ is the amount of left circularly polarized light that is transmitted through the sample.

Function 306 corresponds to circular dichroism spectra of L-phenylalanine. Function 308 corresponds to circular dichroism spectra of D-phenylalanine. Function 306 and function 308 are the circular dichroism spectra of the same amount of L- and D-phenylalanine, respectively. As can be seen from graph 300, functions 306 and 307 have an approximately equal but opposite signal. Function 310 corresponds to the spectrum from a mixture (racemate) of the same amount of L- and D-phenylalanine.

Accordingly, chiral photonic analyzing systems permit scientists to identify enzymes and proteins based on their dichroic signature. Despite their enhancements, the cost and reuse of plasmonic metamaterials has inhibited their scalability in product design. For example, plasmonic chiral metamaterials utilize noble metals to induce their chiral optical effects however, these metals are very expensive and organic molecules often adhere to them via adsorption. Further, related chiral photonic analyzing systems operate in the ultraviolet (UV) spectrum. UV lasers are very expensive to own and operate, which increases the overall cost to analyze analytes.

What is needed is a system and method for a chiral photonic analyzing system that does not rely on a tunable UV laser as a light source.

A chiral photonic analyzing system and method in accordance with the present disclosure does not rely on a tunable UV laser as a light source.

The present disclosure includes methods to realize chiroptical signals from analytes by way of coupling analytes to harmonic generation and opto-electronic processes.

A first method to sense circular dichroism from organic chiral media utilizes harmonic generation from a randomly dispersed chiral organic solution that is placed on a metamaterial structure, which in one example is a silicon-on-insulator (SIO) wafer. The second method to sense circular dichroism from organic chiral media utilizes harmonic generation that is supplanted by an electrostatic field between two electrodes of the same metamaterial structure.

The current technology relies on the linear optical susceptibility, which is often very weak for chiral organic molecules. The susceptibility, $\chi$, in relation to the electromagnetic field, E, is described in equation (2) below:

$$\chi(E) = \chi(1) + \chi(2) \cdot E + \chi(3) : EE \quad (2)$$

The induced polarization, P, of a beam incident on a material can be attributed to the linear susceptibility as indicated in equation (3) below:

$$P = \varepsilon_0 \chi(1) \cdot E \quad (3)$$

In an example embodiment, a silicon-on-insulator structure creates strong chiral signals in the linear infra-red (IR) regime. The strong circular dichroism in the IR will help to induce nonlinear generation of second and third harmonic signals. Chiral analytes typically demonstrate circular dichroism in the ultraviolent window, which makes them even harder to measure due to the expensive cost of optics in this range, as discussed above. However nonlinear generation provides an opportunity for signals at different wavelengths to interact and generate a response. The relationship between the dielectric polarization density for the 2nd harmonic wave can be approximated as shown below in equation (4):

$$P \sim \chi(2) E^2 \quad (4)$$

Both the susceptibility tensor of the chiral metamaterial and chiral analyte are considered to provide an effective value, $\chi_{eff}$, per given wavelength as shown below in equation (5):

$$\chi_{eff} = \chi_{(MM)} + \chi_{Analyte} \quad (5)$$

The enhanced cavity and resonance of the metamaterial thus enables sensing of the analyte.

A system and method of sensing circular dichroism from organic chiral media will now be described in greater detail with reference to FIGS. 4A-21.

Figure 4A:
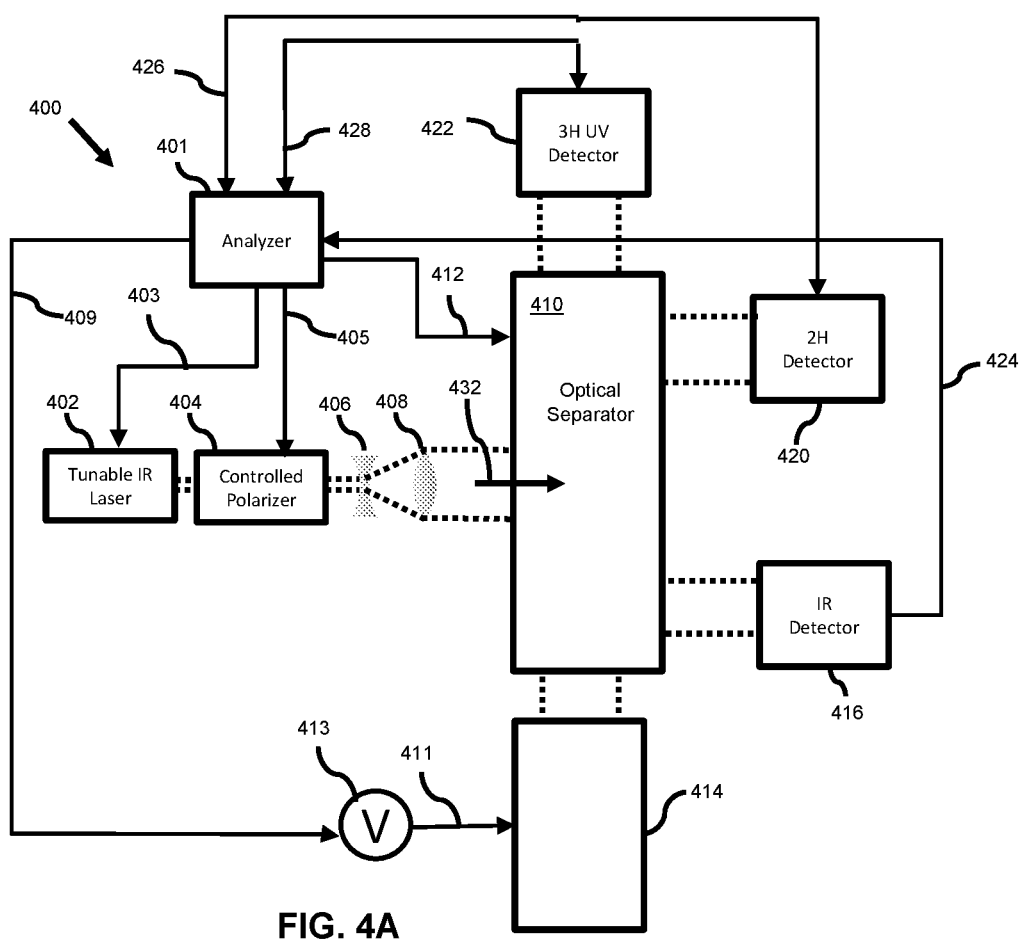
FIG. 4A illustrates a chiral sensing system for analyzing analytes in accordance with aspects of an exemplary embodiment at a time $t_0$.

FIG. 4A illustrates a chiral sensing system 400 for analyzing analytes in accordance with aspects of an exemplary embodiment at a time to.

As shown in the figure, chiral sensing system 400 includes an analyzer 401, a tunable IR laser 402, a laser control line 403, a controlled polarizer 404, a polarizer control line 405, a beam expanding lens 406, a collimating lens 408, voltage control line 409, an optical separator 410, an optical separator control line 412, a voltage supply line 411, a voltage source 413, a stage 414, an IR spectrometer detector 416, a second harmonic (2H) spectrometer detector 420, a third harmonic (3H) UV spectrometer detector 422, and IR detector line 424, a 2H detector line 426, and a 3H UV detector line 428.

Analyzer 401 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions tunable IR laser 402, controllable polarizer 404, and voltage source 413 in accordance with the embodiments described in the present disclosure.

Tunable IR laser 402 may be any known light source or systems that is configured to output a coherent light beam in the IR spectrum. Further, tunable IR laser 402 is configured to tune the output coherent light beam from one frequency in the IR spectrum to another frequency in the IR spectrum, thereby spanning a predetermined bandwidth.

Laser control line 403 may be any known type of wired or wireless communication channel that is configured to transmit information from analyzer 401 to tunable IR laser 402.

Controlled polarizer 404 may be any device or system that is configured to receive IR coherent light from tunable IR laser 402 and output the IR coherent light as a righthand circular polarized light beam in a first state or to output the IR coherent light as a lefthand circular polarized light beam in a second state.

Polarizer control line 405 may be any known type of wired or wireless communication channel that is configured to transmit information from analyzer 401 to controlled polarizer 404.

Beam expanding lens 406 is illustrated as a single lens for purposes of brevity. It should be known that beam expanding lens 406 may be any lens or lens system that is configured to expand the beam width of the coherent light from controlled polarizer 404 to a beam width that coincides with each of IR detector 416, 2H UV detector 420, and 3H UV detector, as will be described in greater detail below.

Collimating lens 408 is illustrated as a single lens for purposes of brevity. It should be known that collimating lens 408 may be any lens or lens system that is configured to collimate the expanding beam of the coherent light from beam expanding lens 406.

Voltage control line 409 may be any known type of wired or wireless communication channel that is configured to transmit information from analyzer 401 to voltage source 413.

Optical separator 410 may be any known controllable optical system that is configured to split and filter light generated from stage 414 to light that may be detected by IR detector 416, 2H detector 420, and 3H UV detector 422, respectively. Optical separator 410 may be tuned via a control signal from analyzer 401 by way of optical separator control line 412. Such controllable optical systems include combinations of beam splitters, quarter-wave plates, polarizers, etc., that may be electrically controlled to pass predetermined bands of light. These known systems will not be described further here, for purposes of brevity.

Voltage supply line 411 may be any known type of conductor that is configured to provide an electrical bias to stage 414, as will be described in greater detail below.

Voltage source 413 may be any device or system that is configured to provide a bias potential to stage 414, as will be described in greater detail below.

Stage 414, as will be described in greater detail below, may be any device or system that is configured to hold a randomly dispersed chiral organic solution for analysis. Stage 414 is arranged to receive the coherent light beam from tunable IR laser 402. In some non-limiting example embodiments, stage 414 includes a silicon-on-insulator (SOI) resonating cavity structure configured to generate chiral signals in a linear IR regime. Further, stage 414 is configured to generate a second harmonic optical signal from the light beam from tunable IR laser 402. Stage 414 is further configured to output the second harmonic optical signal.

IR detector 416 is arranged to receive the collimated coherent IR light that has been reflected from stage 414, via beam splitting mirror 412. IR detector 116 may be any device or system that is configured to detect an amount of light reflected from stage 414. This will be described in greater detail below.

2H detector 420 may be any device or system that is configured to detect light in a predetermined 2H band. In a non-limiting example embodiment, if IR light 432 is from 700-1400 nm, then a second harmonic generated light may be expected to be anywhere from 350-700 nm. Second harmonics could also be generated for a IR light 432 at 500 nm, to achieve a second harmonic range at 250 nm. It should be noted however, that in some example embodiments that use SOI metamaterial will not operate in this range.

3H UV detector 422 detector 420 may be any device or system that is configured to detect light in the 3H UV band. For example, if IR light 432 is from 700-1400 nm, then a third harmonic generated light may be expected to be anywhere from 233-455 nm.

It should be noted that chiral sensing system 400 discussed above is a non-limiting example embodiment of a chiral sensing system in accordance with aspects of the present disclosure. As opposed to three separate detectors, any number of detectors may be used in accordance with aspects of the present disclosure, so long as at least one of the detectors is able to detect harmonically generated light in the UV spectrum.

Figure 5:
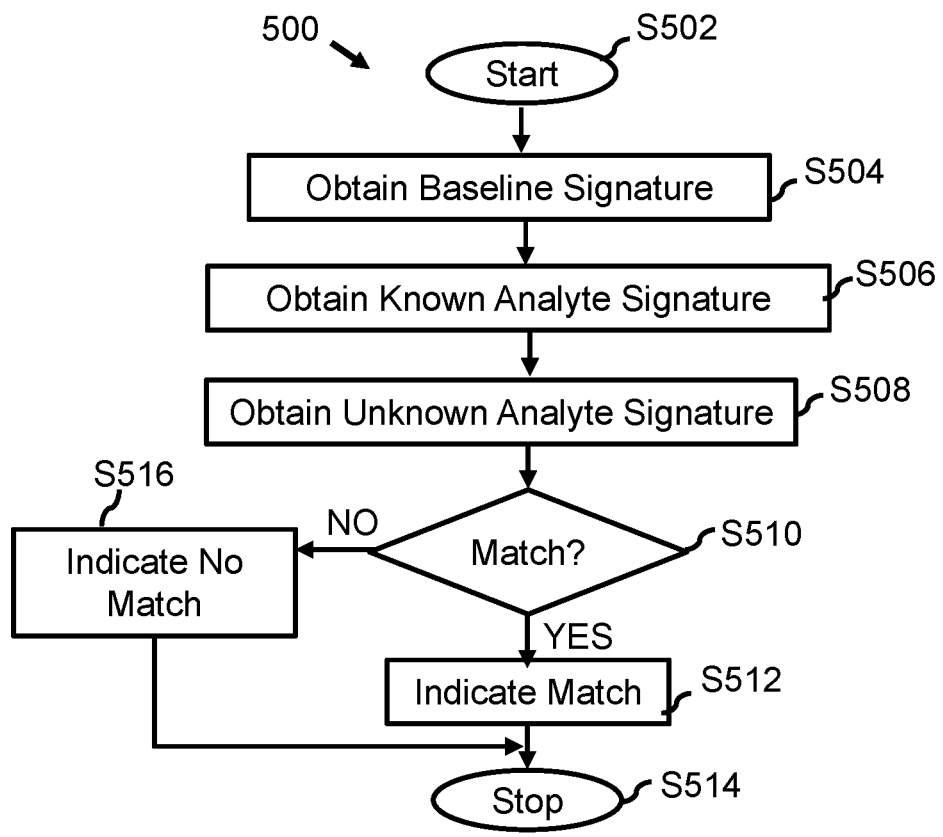
FIG. 5 illustrates a process for analyzing analytes in accordance with aspects of the present disclosure.

FIG. 5 illustrates a process 500 for analyzing analytes in accordance with aspects of the present disclosure.

As shown in the figure, process 500 starts (S502) and a baseline signature is obtained (S504). A baseline signature is a dichroic signature of stage 414 without an analyte to be tested. For example, as shown in FIG. 4A, tunable IR laser 402 emits a coherent beam to controlled polarizer 404. For purposes of discussion, let controlled polarizer 404 be configured to, at this point, polarize the coherent beam from IR laser 402 into a right-hand circular polarized beam.

Beam expending lens 406 expands the beam width of the right-hand circular polarized IR light, which is then columnized by columnizing lens 408. IR light from columnizing lens 408 than travels toward beam splitting mirror 410 as shown by arrow 432.

It should be noted that the system is operating with light, and is therefore operating at light speeds. Therefore, while FIG. 4A illustrates chiral sensing system 400 at a time t$_0$, FIG. 4B illustrates chiral sensing system 400 at a time t$_1$, and FIG. 4C illustrates chiral sensing system 400 at a time t$_2$, it should be noted that this is merely a schematic explanation and to describe the operation of optical separator 410.

Figure 4B:
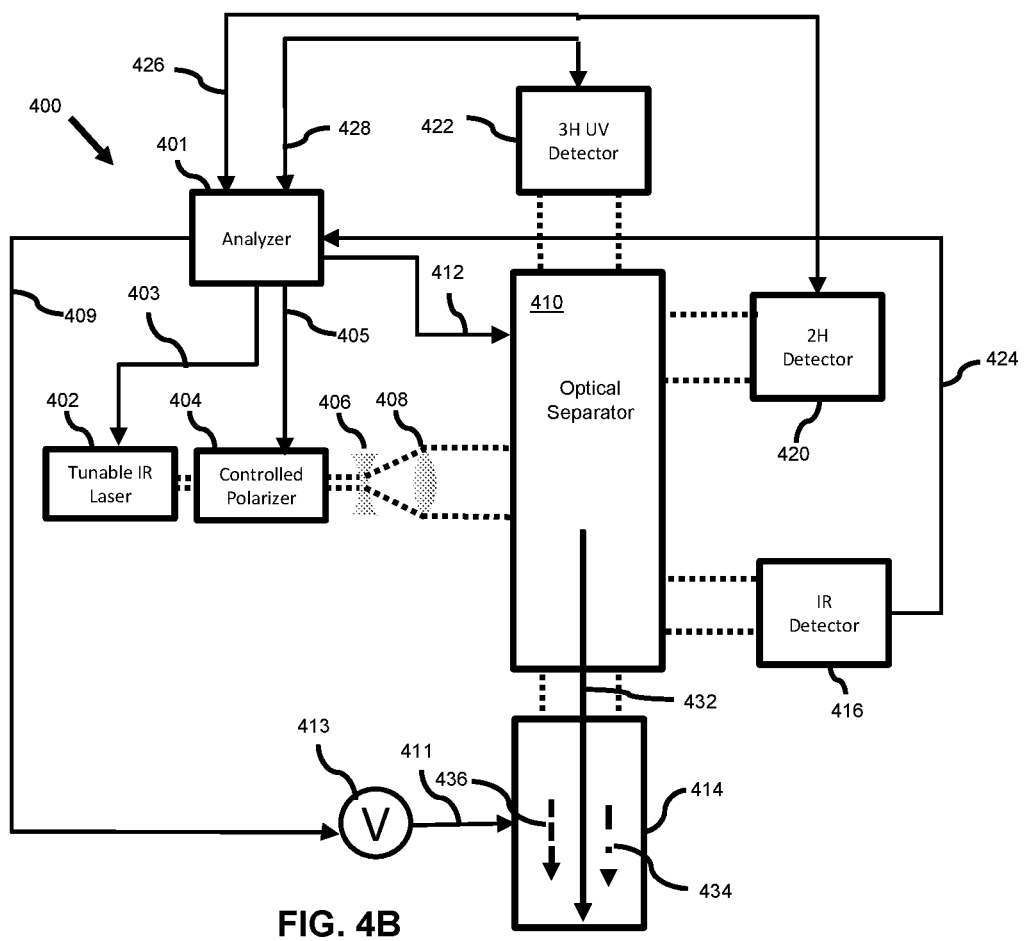
FIG. 4B illustrates the chiral sensing system of FIG. 4A at a time $t_1$.
Figure 4C:
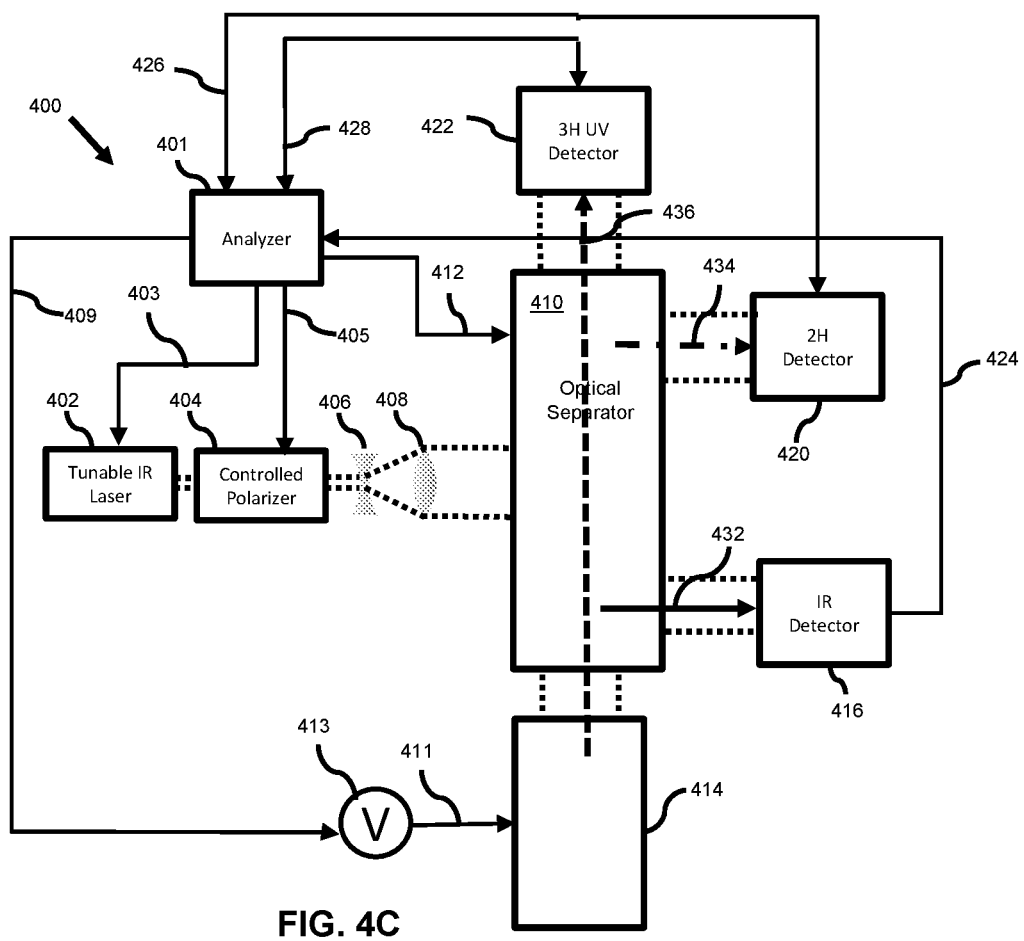
FIG. 4C illustrates the chiral sensing system of FIG. 4A at a time $t_2$.

FIG. 4B illustrates chiral sensing system 400 at a time t$_1$.

As shown in the figure, IR light 432 passes through optical separator 410 and enters stage 414. While in stage 414, IR light 432 resonates in stage 414 to promote generation of a second harmonic (2H) light 434, which in some example embodiments may be in the UV spectrum, and a third harmonic (3H) light 436 in the UV spectrum. This will be described in greater detail with reference to FIG. 6A.

Figure 6A:
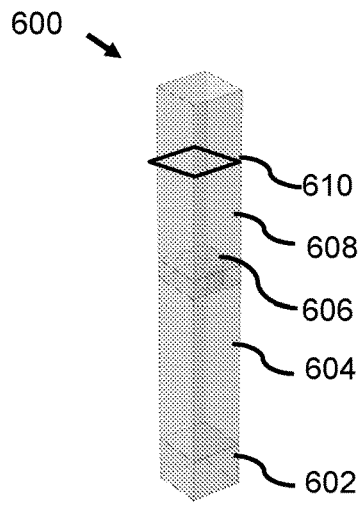
FIG. 6A illustrates an oblique view of a unit cell of a stage of the chiral sensing system of FIG. 4A.

FIG. 6A illustrates an oblique view of a unit cell 600 of stage 414 of chiral sensing system 400. As shown in the figure, unit cell 600 includes a silicon handle 602, a SiO$_2$ layer 604, a silicon electrode 606, and an electrode 610. SiO$_2$ layer 604 is disposed between silicon handle 602 and silicon electrode 606, such that silicon handle 602, SiO$_2$ layer 604, and silicon electrode 606 form a SOI resonating cavity structure.

Further, as will be described in greater detail below, the SOI resonating cavity structure of silicon handle 602, SiO$_2$ layer 604, and silicon electrode 606 is configured to generate a second harmonic optical signal from an IR light beam, wherein the second harmonic optical signal is in the UV spectrum. Further, as will be described in greater detail below, the SOI resonating cavity structure of silicon handle 602, SiO$_2$ layer 604, and silicon electrode 606 is additionally configured to generate a third harmonic optical signal from an IR light beam, wherein the third harmonic optical signal is also in the UV spectrum.

The structure of silicon electrode 606 will be described in greater detail with reference to FIGS. 7-9.

Figure 7:
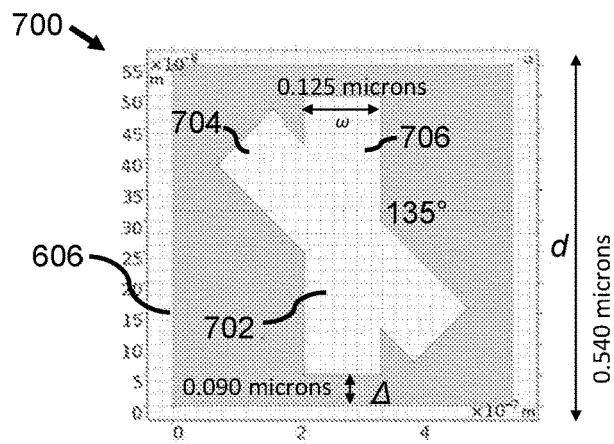
FIG. 7 illustrates a silicon electrode layer of a unit cell of a stage of the chiral sensing system of FIG. 4A.

FIG. 7 illustrates a non-limiting example embodiment of silicon electrode 606 of a unit cell 700 of stage 414 of chiral sensing system 400. As shown in the figure, silicon electrode 606 is a square having a side length, d, of 0.54 microns and has a cutout portion 702 to permit light to pass therethrough. In this non-limiting example embodiment, cutout portion 702 includes a rectangular leg portion 704 crossing over a rectangular leg portion 706 at an angle of 135°. Cutout portion 702 is generally centrally located in unit cell 700, and includes a rectangular leg portion 704 and a rectangular leg portion 706, wherein rectangular leg portion 706 is centrally located and spaced from a top side and bottom side by a distance, A, which in this example is 0.09 microns. Further each of rectangular leg portion 704 and rectangular leg portion 706 have a width, co, which in this example is 0.125 microns.

It should be noted that the shape of cutout portion 702 is not chiral on its own. However light is passed through silicon electrode 606, then it reflects off silicon handle 602 and passes through silicon electrode 606 again. Accordingly, the three dimensional shape of unit cell 600—imagine to be composed of silicon electrode 606 plus a mirrored version of electrode 606 at a 45 degree angle—would be chiral. Specifically, chiral such that when the three dimensional structure of unit cell 600 onto a mirror version of itself, they would not be congruent.

By modifying any of d, Δ, or ω, will result in a different dichroic response. Some different examples are shown in FIG. 8.

Figure 8:
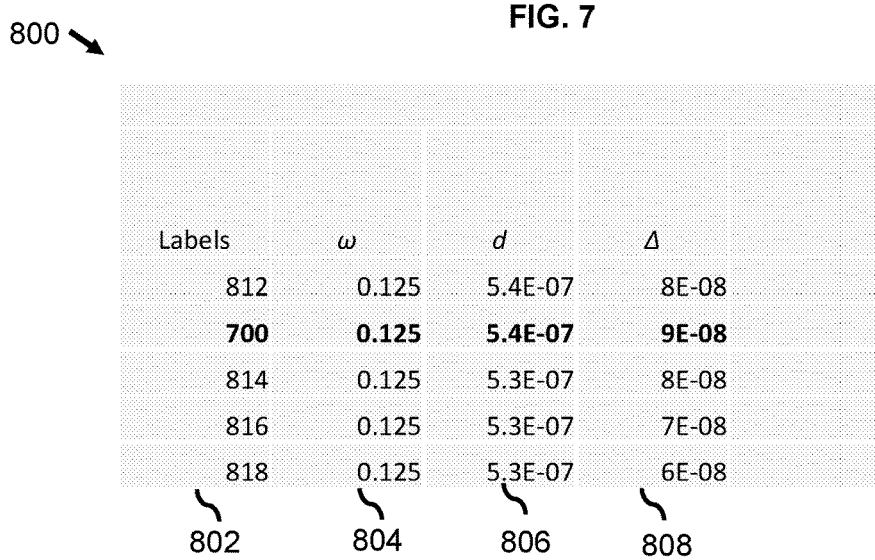
FIG. 8 illustrates a table of parameters of different metamaterial structures for electrode layers of a unit cell of a stage of the chiral sensing system of FIG. 4A.

FIG. 8 illustrates a table 800 of parameters of different metamaterial structures for electrode layers of a unit cell of stage 414 of chiral sensing system 400. As shown in the figure, table 800 includes a labels column 802, a ω column 804, a d column 806, and a Δ column 808. The parameters for unit cell 700 discussed above with reference to FIG. 7 as shown in the second row of table 800. The first row of table 800 includes parameters for a unit cell 812, whereas the third, fourth, and fifth rows of table 800 includes parameters for a unit cell 814, a unit cell 816 and a unit cell 818, respectively.

Figure 9:
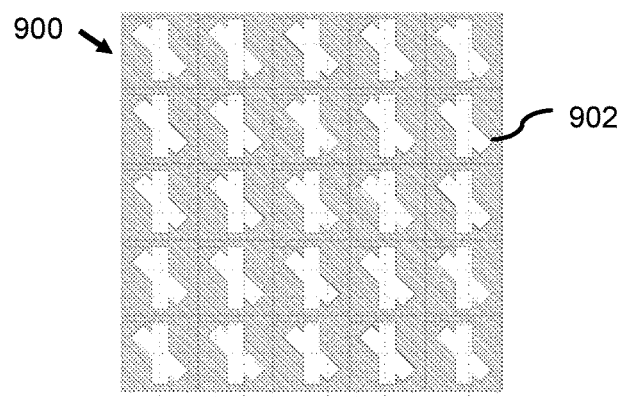
FIG. 9 illustrates an array of unit cells of a stage of the chiral sensing system of FIG. 4A.

FIG. 9 illustrates an array of unit cells 900 of stage 414 of chiral sensing system 400. As shown in the figure, array of unit cells 900 includes a two dimensional array of individual unit cells, a sample of which is indicated as unit cell 902.

As will be discussed in greater detail below, silicon electrode 606 and electrode 610 are configured to receive a bias from a voltage source so as to create an electric field between silicon electrode 606 and electrode 610.

Returning to FIG. 4B, eventually a percentage of IR light 432, 2H light 434, and 3H light 436 escape the resonating cavity within stage 414 to be detected. This will be described in greater detail with reference to FIG. 4C.

FIG. 4C illustrates chiral sensing system 400 at a time $t_2$.

As shown in the figure, IR light 432 is reflected by optical separator 410 to IR detector 416, 2H light 434 is reflected to 2H detector 420, and 3H UV light 436 is passed to 3H UV detector 422.

Figure 10:
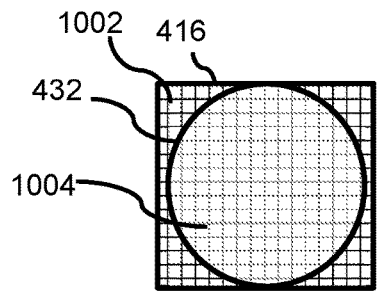
FIG. 10 illustrates a planar view of an infrared (IR) detector of the chiral sensing system of FIG. 4A.

FIG. 10 illustrates a planar view of IR detector 416 of chiral sensing system 400. As shown in the figure, IR detector 416 is sized such that the entire beam width of IR light 432 will be detected by IR detector 416. The remaining portion of cells 1004 in IR detector 416 will detect IR light 432.

In some embodiments, IR detector 416 may be configured to output a value corresponding to a total amount of detected IR light 432 to analyzer 401 via IR detector line 424. In other embodiments, IR detector 416 may be configured to output an average amount of light detected by each of portion of cells 1004.

Figure 11:
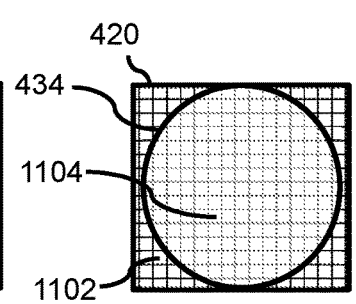
FIG. 11 illustrates a planar view of a $2^{nd}$ harmonic ultraviolet (UV) detector of the chiral sensing system of FIG. 4A.

FIG. 11 illustrates a planar view of $2^{nd}$ harmonic UV detector 420 of chiral sensing system 400.

As shown in the figure, $2^{nd}$ harmonic UV detector 420 to coincide with the entire beam width of 2H light 434. Because $2^{nd}$ harmonic UV detector 420 is square, whereas 2H light 434 has a circular cross-section, there are a portion of cells 1102 in $2^{nd}$ harmonic UV detector 420 that will not detect any of 2H light 434. The remaining portion of cells 1104 in $2^{nd}$ harmonic UV detector 420 will detect 2H light 434.

In some embodiments, $2^{nd}$ harmonic UV detector 420 may be configured to output a value corresponding to a total amount of detected 2H light 434 to analyzer 401 via 2H UV detector line 426. In other embodiments, $2^{nd}$ harmonic UV detector 420 may be configured to output an average amount of light detected by each of portion of cells 1104.

Figure 12:
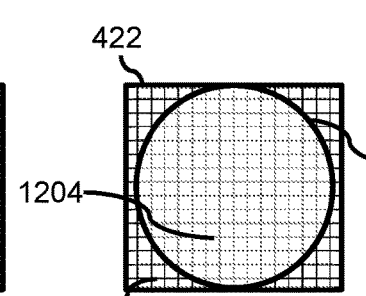
FIG. 12 illustrates a planar view of a $3^{rd}$ harmonic UV detector of the chiral sensing system of FIG. 4A.

FIG. 12 illustrates a planar view of $3^{rd}$ harmonic UV detector 422 of chiral sensing system 400.

As shown in the figure, $3^{rd}$ harmonic UV detector 422 to coincide with the entire beam width of 3H light 436. Because $3^{rd}$ harmonic UV detector 422 is square, whereas 3H light 436 has a circular cross-section, there are a portion of cells 1202 in $3^{rd}$ harmonic UV detector 422 that will not detect any of 3H light 436. The remaining portion of cells 1204 in $3^{rd}$ harmonic UV detector 422 will detect 3H light 436.

In some embodiments, $3^{rd}$ harmonic UV detector 422 may be configured to output a value corresponding to a total amount of detected 3H light 433 to analyzer 401 via 3H UV line 428. In other embodiments, $3^{rd}$ harmonic UV detector 422 may be configured to output an average amount of light detected by each of portion of cells 1204.

Analyzer 401 analyzes data received from IR detector 416, 2H UV detector 420, and 3H UV detector 422. This will be described in greater detail with reference to FIG. 13.

Figure 13:
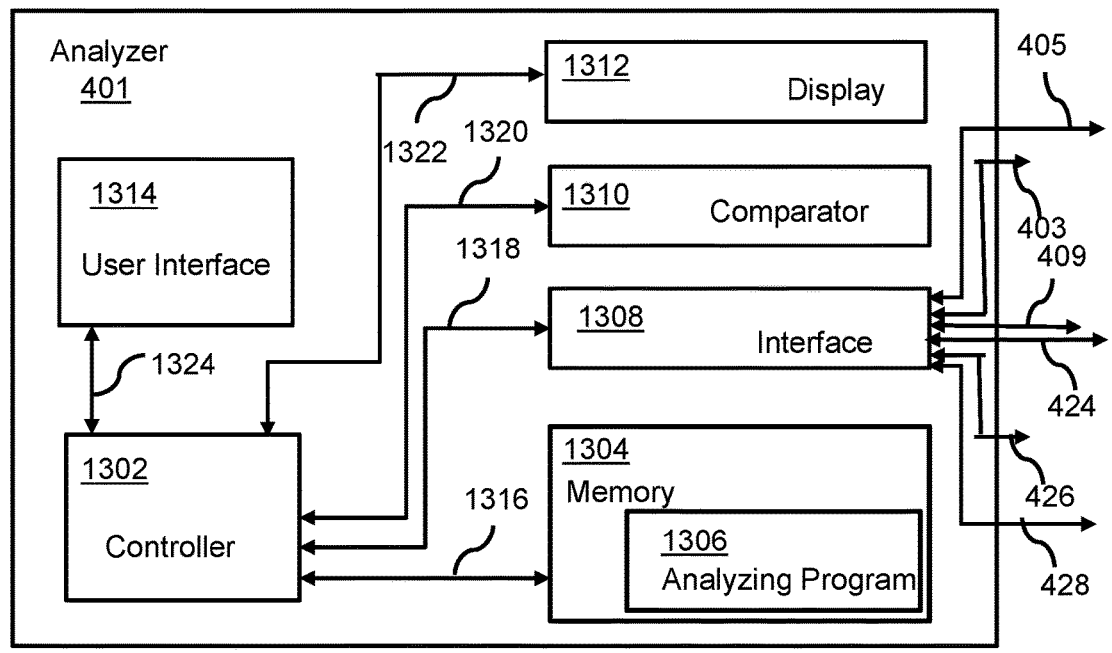
FIG. 13 illustrates an exploded view of a controller of the chiral sensing system of FIG. 4A.

FIG. 13 illustrates an exploded view of analyzer 401 of chiral sensing system 400.

As shown in the figure, analyzer 401 includes a controller 1302, a memory 1304 having an analyzing program 1306 therein, an interface 1308, a comparator 1310, a display 1312, a user interface 1314, and communication lines 1316, 1318, 1320, 1322, and 1324.

In this example, controller 1302, memory 1304, interface 1308, comparator 1310, display 1312, and user interface 1314 are illustrated as individual devices. However, in some embodiments, at least two of controller 1302, memory 1304, interface 1308, comparator 1310, display 1312, and user interface 1314 may be combined as a unitary device. Further, in some embodiments, at least one of controller 1302, memory 1304, interface 1308, comparator 1310, and user interface 1314 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 1302 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation of analyzer 401 in accordance with the embodiments described in the present disclosure.

Memory 1304 had data and instructions, including analyzing program 1306 stored therein. As will be described in greater detail below, in some embodiments, analyzing program 1306 includes instructions, that when executed by controller 1302, cause analyzer 401 to: instruct tunable IR laser 402 to output a coherent light beam having a wavelength in an IR spectrum, so as to cause stage 414 holding a randomly dispersed chiral organic solution therein, to receive the coherent light beam from tunable IR laser 402; and to determine a chiroptical signature for the randomly dispersed chiral organic solution based on a second harmonic optical signal.

As will be described in greater detail below, in some embodiments, analyzing program 1306 includes instructions, that when executed by controller 1302, cause analyzer 401 to: instruct tunable IR laser 402 to output a first coherent light beam having a first wavelength in the IR spectrum at a first time; and instruct tunable IR laser 402 to output a second coherent light beam having a second wavelength in the IR spectrum at a second time.

As will be described in greater detail below, in some embodiments, analyzing program 1306 includes instructions, that when executed by controller 1302, cause analyzer 401 to determine the chiroptical signature for the randomly dispersed chiral organic solution based additionally on a received third harmonic optical signal.

As will be described in greater detail below, in some embodiments, analyzing program 1306 includes instructions, that when executed by controller 1302, cause analyzer 401 to determine the chiroptical signature for the randomly dispersed chiral organic solution based additionally on a received IR optical signal.

As will be described in greater detail below, in some embodiments, analyzing program 1306 includes instructions, that when executed by controller 1302, cause analyzer 401 to instruct voltage source 413 to generate a bias.

As will be described in greater detail below, in some embodiments, analyzing program 1306 includes instructions, that when executed by controller 1302, cause analyzer 401 to instruct voltage source 413 to generate a first bias and to generate a second bias.

Interface 1308 may be any device or system that is configured to receive signals from controller 1302 and transmit signals to laser control line 403, polarizer control line 405, analyzer control line 407, voltage control line 409, IR detector line 424, 2H UV detector line 426, and 3H UV detector line 428.

Comparator 1310 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of comparing at least two signatures in accordance with the embodiments described in the present disclosure.

Display 1312 may be any device or system that is able to output data to be viewed by a user. A non-limiting example of display 1312 includes a liquid crystal display.

User interface 1314 may be any device or system that is configured to enable a user to access and control controller 1302. User interface 1314 may include one or more layers including a human-machine interface (HMI) machines with physical input hardware such a keyboards, mice, game pads and output hardware such as computer monitors, speakers, and printers. Additional user interface layers in user interface 1314 may interact with one or more human senses, including: tactile UI (touch), visual UI (sight), and auditory UI (sound).

Controller 1302 is arranged to communicate with memory 1304 via communication line 1316, to communicate with interface 1308 via communication line 1318, to communicate with comparator 1310 via communication line 1320, to communicate with display 1312 via communication line 1322, and to communicate with user interface 1314 via communication line 1324.

Interface 1308 is arranged to communicate with tunable IR laser 402 via laser control line 403, to communicate with controlled polarizer 404 via polarizer control line 405, to communicate with voltage source 413 via voltage control line 409, to communicate with IR detector 416 via IR detector line 424, to communicate with 2H UV detector 420 via a 2H UV detector line 426, and to communicate with 3H UV detector 422 via a 3H UV detector line 428.

In operation, controller 1302 executes instructions in analyzing program 1306 to cause interface 1308 to instruct tunable IR laser 402 to emit a coherent beam in a starting IR wavelength. This starting wavelength may be predetermined and set in memory 1304 or set by a user via user interface 1314.

Controller 1302 additionally executes instructions in analyzing program 1306 to cause interface 1308 to instruct controlled polarizer to polarize the coherent beam from tunable IR laser 402 in a particular manner. This starting polarization may be predetermined and set in memory 1304 or set by a user via user interface 1314. For purposes of discussion, let the starting polarization be a right-circular polarization.

Returning to FIG. 4C, IR detector 416 detects IR light 432, 2H UV detector 420 detects 2H UV light 434, and 3H UV detector detects 3h UV light 422. IR detector 416 sends the detected value of IR light 432 at this starting wavelength to analyzer 401, whereas 2H UV detector 420 sends the detected value of 2H UV light 434 at this starting wavelength to analyzer 401, and 3H UV detector sends the detected value of 3H UV light 422 at this starting wavelength to analyzer 401.

As shown in FIG. 13, interface 1308 receives the detected value of right-circularly polarized IR light 432 at this starting wavelength, the detected value of right-circularly polarized 2H light 434 at this starting wavelength, and the detected value of right-circularly polarized 3H UV light 422 at this starting wavelength. Controller 1302 executes instructions in analyzing program 1306 to store the detected value of right-circularly polarized IR light 432 at this starting wavelength, the detected value of right-circularly polarized 2H UV light 434 at this starting wavelength, and the detected value of right-circularly polarized 3H UV light 422 at this starting wavelength in memory 1304.

In some embodiments, controller 1302 executes instructions stored in analyzing program 1306 to combine the detected value of right-circularly polarized IR light 432 at this starting wavelength, the detected value of right-circularly polarized 2H UV light 434 at this starting wavelength, and the detected value of right-circularly polarized 3H UV light 422 at this starting wavelength in some form, a non-limiting example of which include a single value based on a linear combination of the three values.

Controller 1302 executes instructions in analyzing program 1306 to instruct tunable IR laser 402 to emit a coherent beam in next IR wavelength. This next wavelength may be a predetermined shift from the previous wavelength or a wavelength shifted by an amount set by a user via user interface 1314.

The process repeats and controller 1302 executes instructions in analyzing program 1306 to store the detected value of right-circularly polarized IR light 432 at this next wavelength, the detected value of right-circularly polarized 2H UV light 434 at this next wavelength, and the detected value of right-circularly polarized 3H UV light 422 at this next wavelength in memory 1304 (or the combined form as mentioned above).

This process continues until a final wavelength is used, thus spanning a portion of the IR band. This portion of the IR band may be predetermined and set in memory 1304 or set by a user via user interface 1314.

At this point, memory 1304 has values associated with right-circularly polarized IR light 432, right-circularly polarized 2H UV light 434, and right-circularly polarized 3H UV light 422 for the portion of the IR band. To determine the dichroic signature of stage 414, without the analyte because this is the baseline signature, the above process is repeated, but with a left-circular polarization.

In particular, at this point, controller 1302 executes instructions in analyzing program 1306 to cause interface 1308 to again instruct tunable IR laser 402 to emit a coherent beam in the starting IR wavelength.

Controller 1302 additionally executes instructions in analyzing program 1306 to cause interface 1308 to instruct controlled polarizer to polarize the coherent beam from tunable IR laser 402 in a polarization that is opposite to the starting polarization. In this example therefore, the new polarization would be a left-circular polarization.

The process continues in a manner as mentioned above until memory 1304 has values associated with left-circularly polarized IR light 432, left-circularly polarized 2H UV light 434, and left-circularly polarized 3H UV light 422 for the portion of the IR band.

Controller 1302 then executes instructions in analyzing program 1306 to cause interface 1308 to generate a dichroic signature for stage 414 based on the values associated with right-circularly polarized IR light 432, right-circularly polarized 2H UV light 434, and right-circularly polarized 3H UV light 422 for the portion of the IR band and based on the values associated with left-circularly polarized IR light 432, left-circularly polarized 2H UV light 434, and left-circularly polarized 3H UV light 422 for the portion of the IR band. In an example embodiment, controller 1302 then executes instructions in analyzing program 1306 to cause interface 1308 to generate a dichroic signature for stage 414 subtracting the values associated with left-circularly polarized IR light 432, left-circularly polarized 2H UV light 434, and left-circularly polarized 3H UV light 422 for the portion of the IR band from corresponding values associated with right-circularly polarized IR light 432, right-circularly polarized 2H UV light 434, and right-circularly polarized 3H UV light 422 for the portion of the IR band.

The generated signature is stored in memory 1304. Further, controller 1302 then executes instructions in analyzing program 1306 to cause display 1312 to display a graph based on the signature. This will be described in greater detail with reference to FIGS. 14-16.

FIG. 14 illustrates a graph 1400 of wavelength versus reflections to illustrate left polarization and right circular polarization in a linear optical regime of chiral sensing system 400.

As shown in the figure, graph 1400 includes a y-axis 1402 of reflection, measured in percentage, an x-axis 1404 of wavelength, measured in nanometers, a left circularly polarized function 1406, and a right circularly polarized function 1408. Functions 1406 and 1408 represent a linear function of a stage in accordance with aspects of the present disclosure. "Linear" meaning the first order light, or in other words, the IR light that is transmitted from tunable IR laser 402.

FIG. 15 illustrates a graph 1500 of wavelength versus reflections to illustrate circular dichroism in a linear optical regime of graph 1400.

As shown in the figure, graph 1500 includes a y-axis 1502 of circular dichroism, measured in percentage, an x-axis 1504 of wavelength, measured in nanometers, and a function 1506. Here, function 1506 is circular dichroic signature of stage 414 in accordance with aspects of the present disclosure.

Function 1506 corresponds to a difference in the values of functions 1406 and 1408 of FIG. 14. In function 1506, positive values represent wavelengths in which stage 414 more greatly affected left-circularly polarized light. Negative values represent wavelengths in which stage 414 is more left-circularly polarized light. The magnitude of the values represent the difference in which the right-circularly polarized light was affected as compared to the left-circularly polarized light.

Therefore, in this example, there is a very large difference in the effect of stage 414 between the right-circularly polarized light and left-circularly polarized light at 1100 nanometers.

As discussed above with reference to FIGS. 7 and 8, the difference in the parameters of silicon electrode 606 promote different dichroic signatures. This will be described with reference to FIG. 16.

Figure 16:
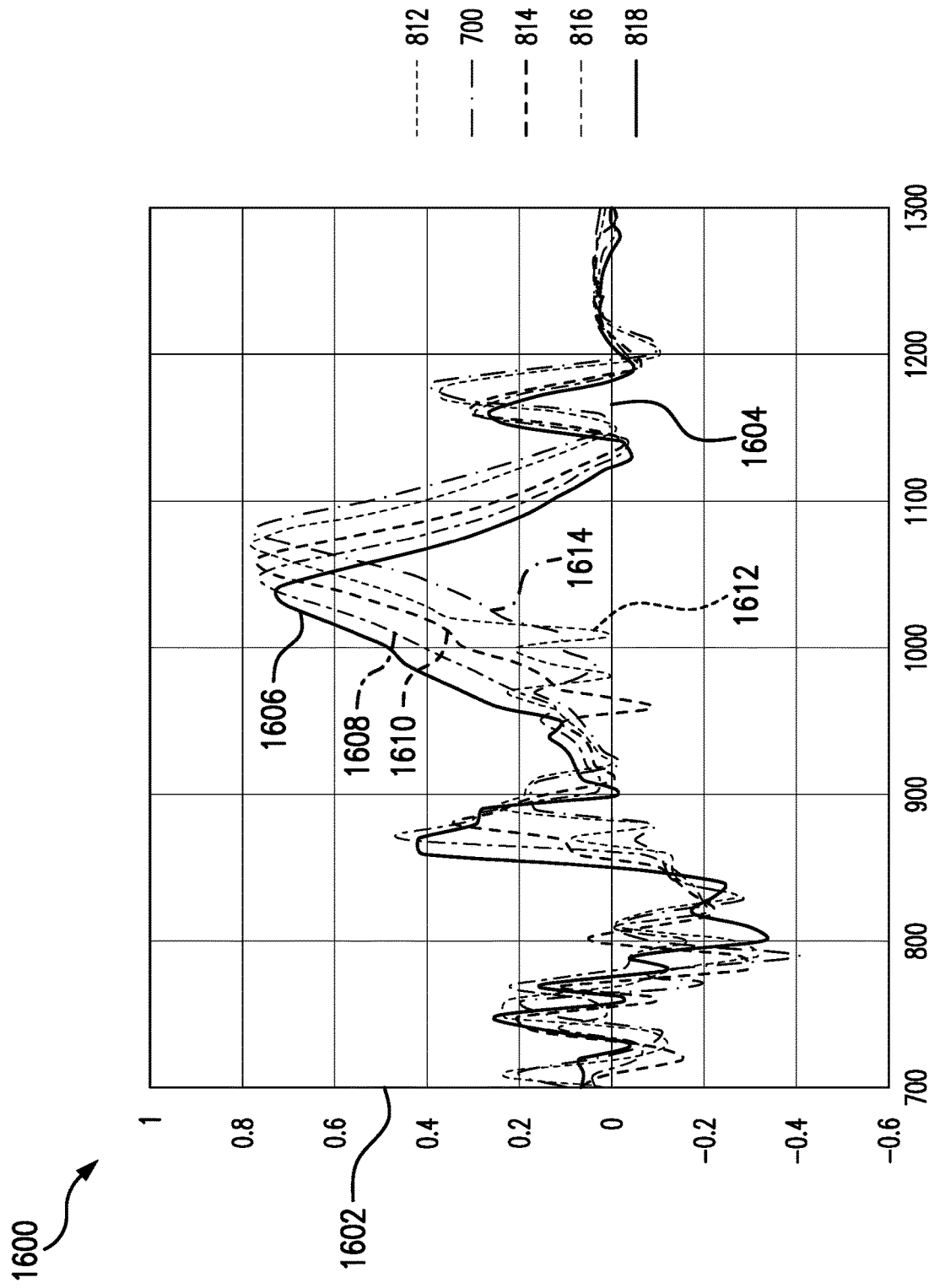
FIG. 16 illustrates a graph of wavelength versus reflections to illustrate circular dichroism in multiple linear optical regimes of the chiral sensing system of FIG. 4A.

FIG. 16 illustrates a graph 1600 of wavelength versus circular dichroism to illustrate circular dichroism in multiple linear optical regimes of chiral sensing system 400.

As shown in the figure, graph 1600 includes a y-axis 1602 of circular dichroism in percentage, an x-axis 1604 of wavelength, measured in nanometers, and functions 1606, 1608, 1610, 1612 and 1614. Functions 1606, 1608, 1610, 1612 and 1614 represent the linear dichroic signature of different stages in accordance with aspects of the present disclosure.

Function 1606 is a dichroic signature of a stage having silicon electrodes corresponding to the parameters in row 818 of FIG. 8. Function 1608 is a dichroic signature of a stage having silicon electrodes corresponding to the parameters in row 816 of FIG. 8. Function 1610 is a dichroic signature of a stage having silicon electrodes corresponding to the parameters in row 814 of FIG. 8. Function 1612 is a dichroic signature of a stage having silicon electrodes corresponding to the parameters in row 812 of FIG. 8. Function 1614 is a dichroic signature of a stage having silicon electrodes corresponding to the parameters in row 700 of FIG. 8 (corresponding to unit cell 700 of FIG. 7). As such, function 1614 is a dichroic signature of stage 414.

It should be noted that the linear, circular dichroic signatures in the IR band are not very strong. However, in accordance with aspects of the present disclosure, the $2^{nd}$ order and $3^{rd}$ order signatures are also be detected. These will be described with reference to FIGS. 17-18.

Figure 17:
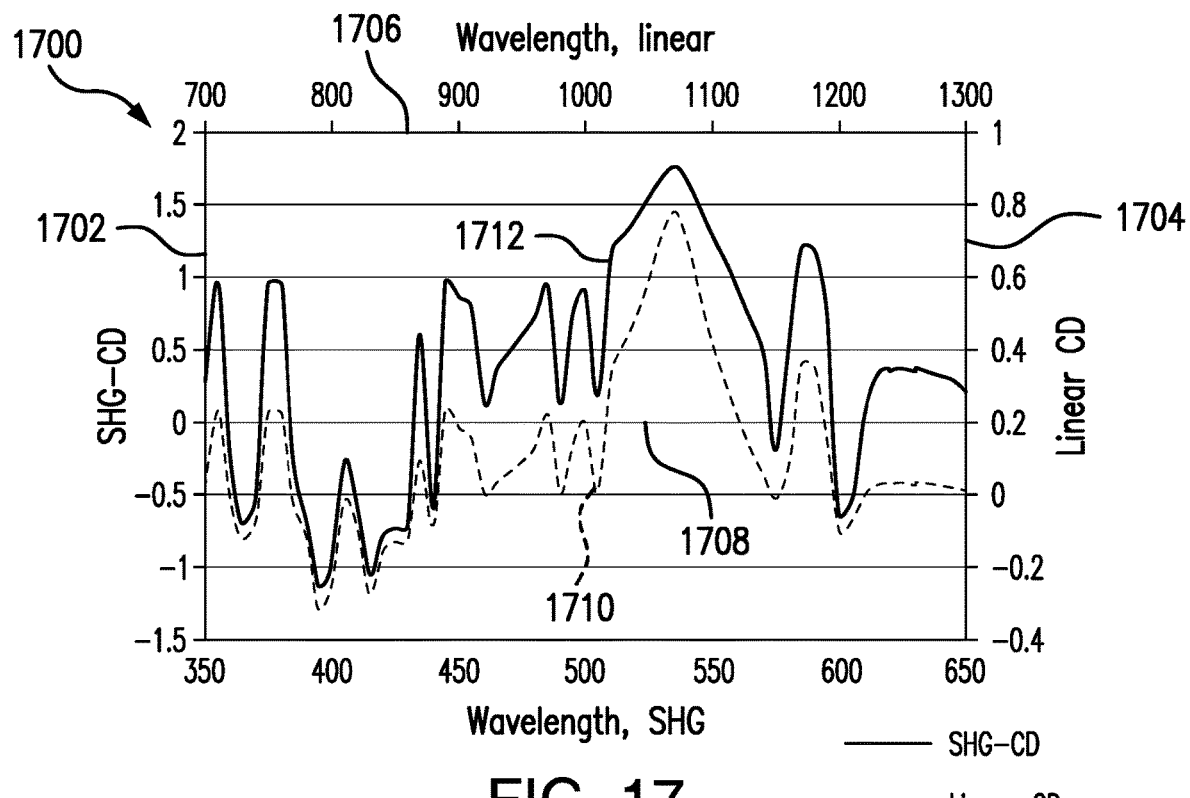
FIG. 17 illustrates a graph of wavelength versus reflections to illustrate circular dichroism in a second harmonic optical regime of the chiral sensing system of FIG. 4A.

FIG. 17 illustrates a graph 1700 of wavelength versus circular dichroism in a second harmonic optical regime of chiral sensing system 400.

As shown in the figure, graph 1700 includes a y-axis 1702 of circular dichroism of 2H light 434 and is unitless, a y-axis 1704 of circular dichroism of IR light 432 in percentage, an x-axis 1706 of wavelength of 2H light 434 in nanometers, an x-axis 1708 of wavelength of IR light 432 in nanometers, a function 1710 and a function 1712.

Function 1710 is the linear, circular dichroic signature for stage 414. In other words, function 1710 is a dichroic signature for stage 414 for IR light 432 (as shown in FIG. 4C), which is in the IR band. As seen from x-axis 1706, this IR band spans from 700-1300 nm. As seen from y-axis 1704, the detected circular dichroism (or CD) of function 1710 ranges from approximately −0.3 percent to 0.8 percent.

Function 1712 is a dichroic signature for stage 414 for $2^{nd}$ order light. In other words, function 1712 is a dichroic signature for stage 414 for 2H light 434, which is in the UV band. As seen from x-axis 1708, this UV band spans from 350-650 nm. As seen from y-axis 1702, the detected second-harmonic-generated circular dichroism (SHG-CD) of function 1712 ranges from approximately −1.1 o 1.75. Accordingly, the detected dichroic signal strength for 2H light 434 is approximately 2.5 times larger than the detected dichroic signal strength of IR light 432. SHG-CD is defined by the following equation (6):

$$SHG\text{-}CD = \frac{I_{2\omega}^{RCP} - I_{2\omega}^{LCP}}{0.5\left(I_{2\omega}^{RCP} + I_{2\omega}^{LCP}\right)} \quad (6)$$

where $I_{2\omega}^{RCP}$ is the intensity of the $2^{nd}$ harmonic right circularly polarized light, and where $I_{2\omega}^{LCP}$ is the intensity of the $2^{nd}$ harmonic left circularly polarized light.

Figure 18:
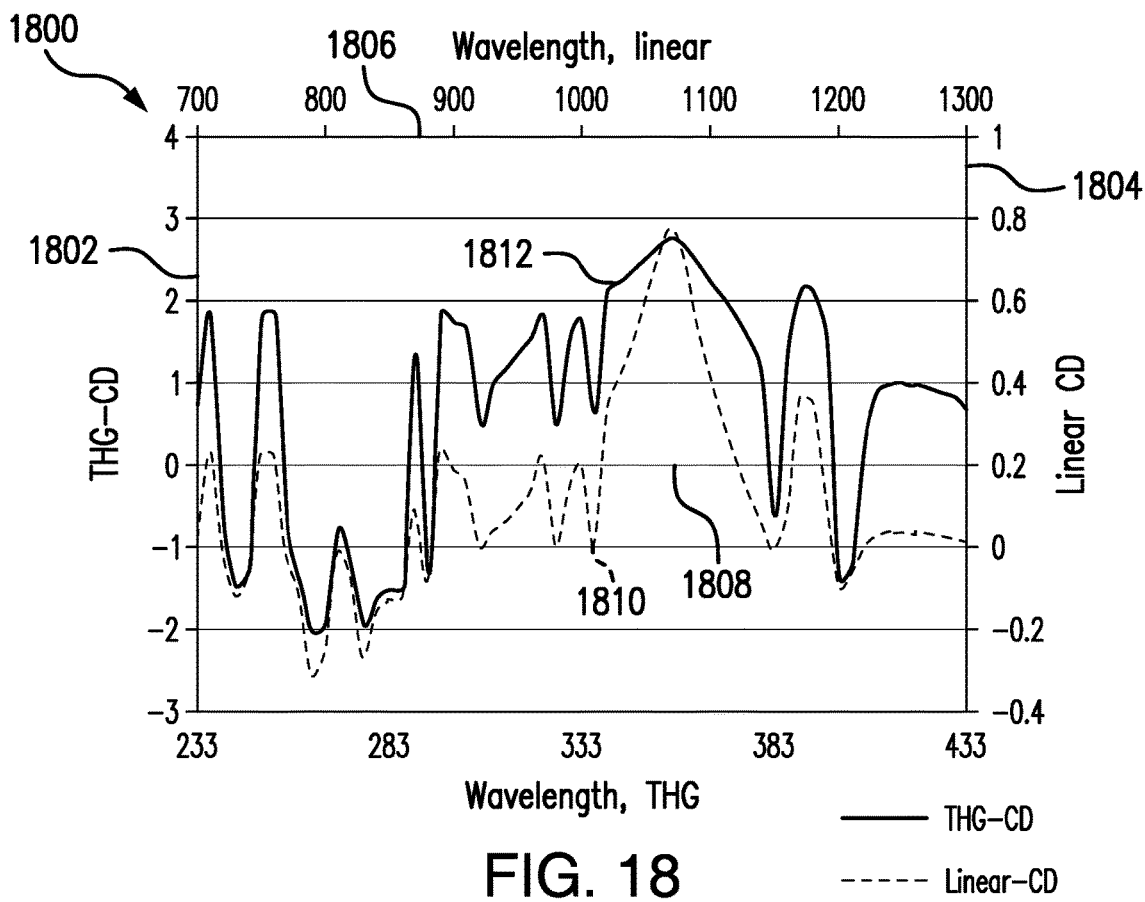
FIG. 18 illustrates a graph of wavelength versus reflections to illustrate circular dichroism in a third harmonic optical regime of the chiral sensing system of FIG. 4A.

FIG. 18 illustrates a graph 1800 of wavelength versus circular dichroism in a third harmonic optical regime of chiral sensing system 400.

As shown in the figure, graph 1800 includes a y-axis 1802 of circular dichroism of 3H light 436 in percentage, a y-axis 1804 of circular dichroism of IR light 432 in percentage, an x-axis 1806 of wavelength of IR light 432 3H light 436 in nanometers, an x-axis 1808 of wavelength of 3H light 436 in nanometers, a function 1810 and a function 1812.

Function 1810 is a linear circular dichroic signature for stage 414. In other words, function 1810 is a dichroic signature for stage 414 for IR light 432 (as shown in FIG. 4C), which is in the IR band. As seen from x-axis 1806, this IR band spans from 700-1300 nm. As seen from y-axis 1804, the CD detected dichroic signal strength of function 1810 ranges from approximately −0.3 to 0.8.

Function 1812 is a dichroic signature for stage 414 for $3^{rd}$ order light. In other words, function 1812 is a dichroic signature for stage 414 for 3H light 436, which is in the UV band. As seen from x-axis 1808, this UV band spans from 235-433 nm. As seen from y-axis 1802, the third-harmonic-generated circular dichroic (THG-CD) detected dichroic signal strength of function 1810 ranges from approximately −2 to 2.5. Accordingly, the detected dichroic signal strength for 3H light 436 is approximately 4 times larger than the detected dichroic signal strength of IR light 432.

Returning to FIG. 5, after a baseline signature is obtained (S504), a signature for a known analyte is obtained (S506). For example, now that the dichroic signature of stage 414 (by itself or with water thereon) has been determined, chiral sensing system 400 may now be trained to recognize known analytes. For purposes of discussion, let the known analyte to now be analyzed by chiral sensing system 400 be a solution of a known molar concentration of a known lipid. Further, let stage 414 include a metamaterial structure, as discussed above for example with reference to FIG. 6A, and also include a lip so as to contain the solution on top of the metamaterial structure.

A dichroic signature for the known analyte is determined by first obtaining a dichroic signature of the analyte on stage 414 and then filtering/comparing out the signature of stage 414 that is stored in memory 1304. In particular, as mentioned above, with reference to FIGS. 4C and 13, analyzer 401 causes tunable IR laser 402 to sweep through a predetermined IR band while controlled polarizer is polarizing the emitted coherent light in a predetermined polarization. Then analyzer 401 causes tunable IR laser 402 to again sweep through the predetermined IR band while controlled polarizer is polarizing the emitted coherent light in the opposite polarization.

Returning to FIG. 13, controller 1302 then executes instructions in analyzing program 1306 to cause interface 1308 to generate a dichroic signature for stage 414 and the known analyte based on the values associated with right-circularly polarized IR light 432, right-circularly polarized 2H UV light 434, and right-circularly polarized 3H UV light 422 for the portion of the IR band and based on the values associated with left-circularly polarized IR light 432, left-circularly polarized 2H UV light 434, and left-circularly polarized 3H UV light 422 for the portion of the IR band.

Controller 1302 then executes instructions in analyzing program 1306 to filter the previously stored dichroic signature for stage 414 from the newly acquired dichroic signature for stage 414 and the known analyte. This will produce a dichroic signature for the known analyte, which is stored in memory. The name of the known analyte may be input, and therefore associated with the dichroic signature for the known analyte via user interface 1314.

A controlled analyzer may be included which acts as the inverse of the controlled polarizer. A related controller polarizer may take the form of a linear polarizer and a quarter wave plate. The controlled analyzer may include a quarter wave plate and a linear polarizer, the order is in the direction from which the light passes through it. The controlled analyzer may be operated by someone skilled in the art. From the controlled analyzer, Stokes vectors can be obtained and circular dichroic data may additionally be obtained.

This process may be repeated to build a library of signatures for known analytes, as each analyte will have a respectively distinct dichroic signature.

It should be noted that in accordance with another aspect of the present disclosure, a more distinct signature may be created by inducing an electric field through a portion of stage 414. This will be described in greater detail with reference to FIG. 6B.

Figure 6B:
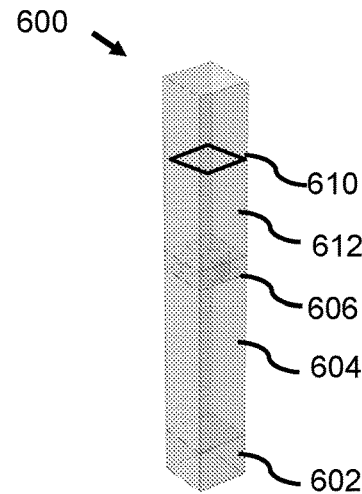
FIG. 6B illustrates an oblique view of the unit cell of FIG. 6A with an analyte.

FIG. 6B illustrates an oblique view of unit cell 600 with an analyte 612. FIG. 6B differs from FIG. 6A in that unit cell 600 includes analyte 612 disposed on silicon electrode 606.

Traditional methods to detect chiroptical signals rely on the summation of polarized photons as they randomly propagate from one molecular dipole to the next. This summation provides a weak chiral signal. In accordance with aspects of the present disclosure, a voltage bias is used to elucidate different orientations of the susceptibility tensor, by utilizing the dipole moments of chiral analytes.

As discussed above with reference to equation (2), the dichroic signature for the $2^{nd}$ order generated light is a function of the electric field. Therefore, as the electric field increases, the detected dichroic signal strength additionally increases. This is called electric field induced harmonic generation. This will be described in greater detail with reference to FIGS. 19-20.

Figure 19:
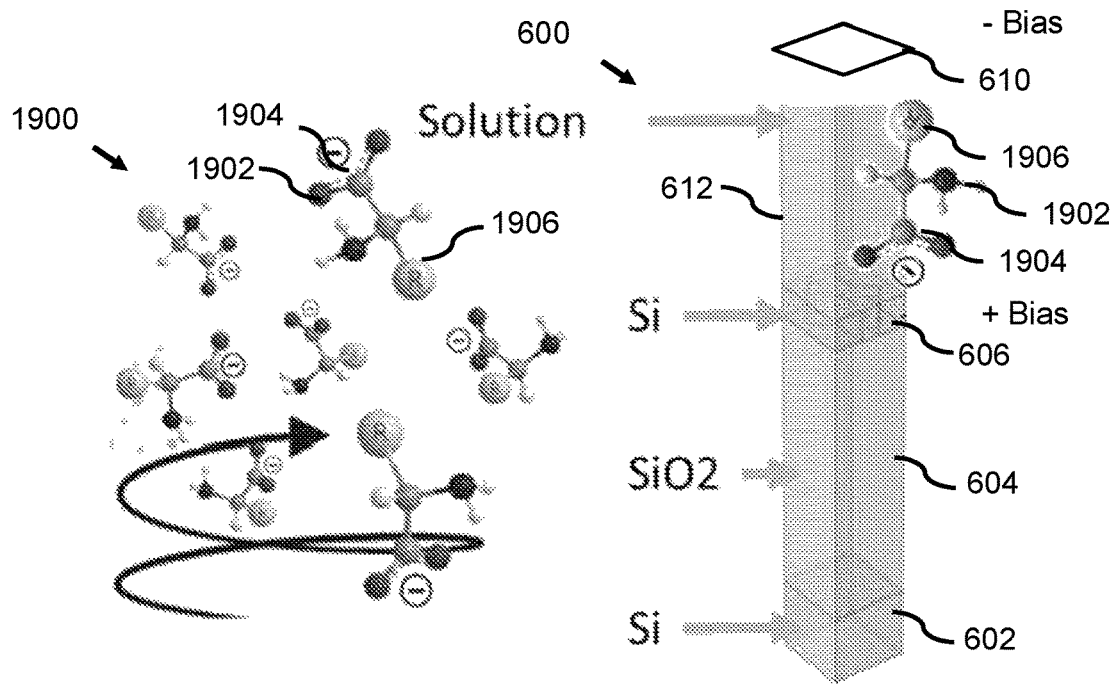
FIG. 19 illustrates an oblique view of the unit cell of FIG. 6B and the relationship with the polar molecules within the randomly dispersed chiral organic solution within an analyte.

FIG. 19 illustrates an oblique view of unit cell 600 and the relationship with the polar molecules 1900 of the analyte within the randomly dispersed chiral organic solution within analyte 612.

As shown in the figure, each of polar molecules 1900, an example of which is indicated as polar molecule 1902, has an overall negatively charged end, which in the case of polar molecule 1902 is negatively charged end 1904, and an overall positively charged end, which in the case of polar molecule 1902 is positively charged end 1906.

Returning to FIG. 4, voltage source 413 is configured to provide a bias to stage 414. As shown in FIG. 19, the bias takes the form of a negative charge applied to electrode 610 and a positive charge applied to silicon electrode 606. The difference in the charges between electrode 610 and silicon electrode 606 generates an electric field between electrode 610 and silicon electrode 606.

When analyte 612 is disposed on silicon electrode 606, each of the polar molecules 1900 align in similar manner as a result of the generated electric field between electrode 610 and silicon electrode 606. As shown in the figured, polar molecule 1902 is illustrated as a representative polar molecule, wherein polar molecule 1902 is aligned such that positively charged end 1906 is closer to electrode 610 having the negative charge and such that the negatively charged end 1904 is closer to silicon electrode 606 having the positive charge. The alignment of the molecules partially removes the random disorder from the molecules and provides a perspective in the susceptibility tensor of the analyte.

Here the electric field serves multiple purposes. First, it allows for the electric field-induced second harmonic generation. Second, it allows for the chiral organic material to be pulled towards the metamaterial surface, which in this example is silicon electrode 606. The orientation of the chiral molecules under the polarizability of the DC electric field enables retrieval of a Mueller matrix, which represents how analyte 612 affects polarized light.

Figure 20:
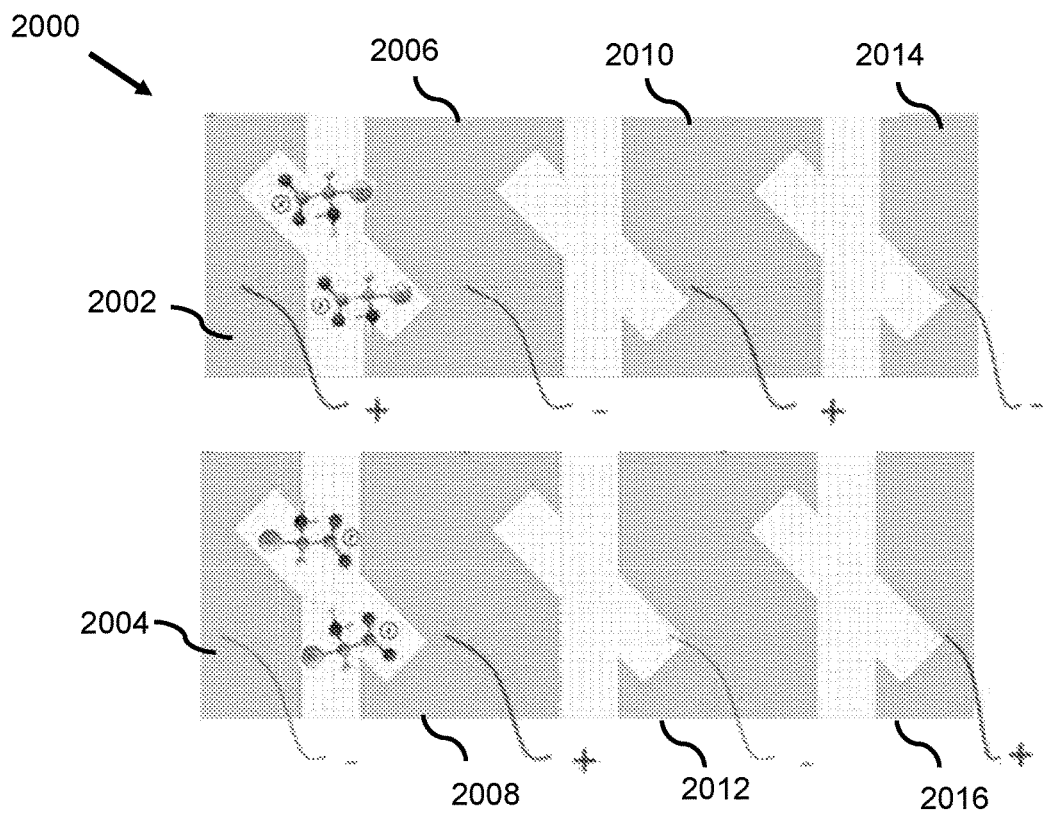
FIG. 20 illustrates a portion of an array of electrodes in a silicon electrode layer of the array of unit cells of a stage of the chiral sensing system of FIG. 4A.

FIG. 20 illustrates a portion 2000 of an array of electrodes in a silicon electrode layer of the array of unit cells of stage 414 of chiral sensing system 400. The alignment of the molecules partially removes the random disorder from the molecules and provides a perspective in the susceptibility tensor of the analyte. By aligning the molecules, the chiral measurement can be enhanced and different perspectives on the chirality can be obtained.

As shown in the figure, portion 2000 includes silicon electrodes 2002, 2004, 2006, 2008, 2010, 2012, 2014, and

2016. Silicon electrodes 2002, 2008, 2010, and 2016 are configured to receive a positive charge from voltage source 413 (not shown), whereas silicon electrodes 2004, 2006, 2012, and 2014 are configured to receive a negative charge from voltage source 413 (not shown).

The electrode structure as shown in FIG. 20 enables for different orientations in the x, y, and z planes, to be achieved based on the application of the DC voltage across the various electrodes presented in the metamaterial system. The strong nonlinear chiral tensor of the metamaterial greatly enhances of weak chiral tensor of the organic material in analyte 612. The hotspots in the chiral structure enable local field enhancement around analyte 612.

An example signature for a third order signal of an analyte will now be described with reference to FIG. 21.

Figure 21:
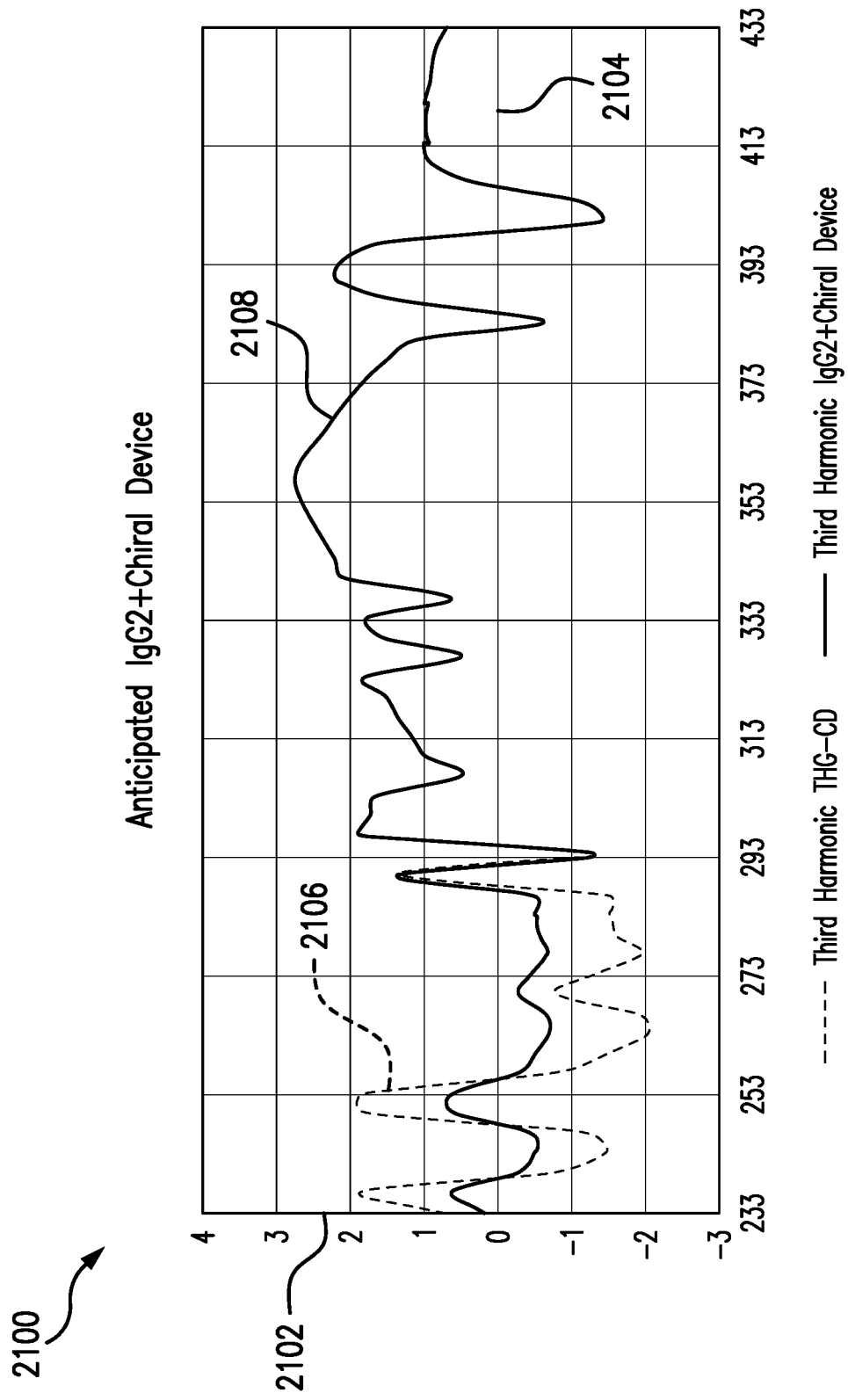
FIG. 21 illustrates a graph of circular dichroism in a third harmonic optical regime of the chiral sensing system of FIG. 4A with and without an analyte.

FIG. 21 illustrates a graph 2100 of circular dichroism in a third harmonic optical regime of chiral sensing system 400 with and without an analyte.

As shown in the figure, graph 2100 includes a y-axis 2102 of circular dichroism measured in percent, an x-axis 2104 measured in nanometers, a function 2106 and a function 2108.

Function 2106 is an estimated dichroic signature of 3H light 436 of stage 414 as discussed above with reference to FIG. 4. Function 2108 is an estimated dichroic signature of 3H light 436 of stage 414 with the addition of analyte 612, for example as shown in FIG. 6B. Function 2108 corresponds to the THG-CD for the 414, whereas function 2106 corresponds to the THG-CD for a protein, such as IgG2 which is "Immunoglobulin G".

For example, now that a library of dichroic signatures known analytes has been created, an unknown analyte may be tested to determine if it is one of the known analytes.

A dichroic signature for the unknown analyte is determined by first obtaining a dichroic signature of the unknown analyte on stage 414 and then filtering out the signature of stage 414 that is stored in memory 1304. In particular, as mentioned above, with reference to FIGS. 4C and 13, analyzer 401 causes tunable IR laser 402 to sweep through a predetermined IR band while controlled polarizer is polarizing the emitted coherent light in a predetermined polarization. Then analyzer 401 causes tunable IR laser 402 to again sweep through the predetermined IR band while controlled polarizer is polarizing the emitted coherent light in the opposite polarization.

Returning to FIG. 13, controller 1302 then executes instructions in analyzing program 1306 to cause interface 1308 to generate a dichroic signature for stage 414 and the unknown analyte based on the values associated with right-circularly polarized IR light 432, right-circularly polarized 2H UV light 434, and right-circularly polarized 3H UV light 422 for the portion of the IR band and based on the values associated with left-circularly polarized IR light 432, left-circularly polarized 2H UV light 434, and left-circularly polarized 3H UV light 422 for the portion of the IR band.

Controller 1302 then executes instructions in analyzing program 1306 to filter the previously stored dichroic signature for stage 414 from the newly acquired dichroic signature for stage 414 and the unknown analyte. This will produce a dichroic signature for the unknown analyte, which is stored in memory.

Controller 1302 then then executes instructions in analyzing program 1306 to cause comparator 1310 to compare the dichroic signature for the unknown analyte, with previously stored dichroic signatures for the known analytes. The previously stored dichroic signatures for the known analytes may include multiple different signatures associated with respective multiple different molar concentrations of a single solution.

Comparator 1310 may determine whether the dichroic signature for the unknown analyte "matches" at least one of the previously stored dichroic signatures for the known analytes by any known method. For example, in some embodiments, if the dichroic signature for the unknown analyte is the same as at least one of the previously stored dichroic signatures for the known analytes, controller 1302 may determine that the unknown analyte is the analyte associated with the matching dichroic signature that was previously stored in memory 1304. In other embodiments, if the dichroic signature for the unknown analyte has a cross-correlation coefficient within a predetermined threshold with as at least one of the previously stored dichroic signatures for the known analytes, controller 1302 may determine that the unknown analyte may be any of the analytes associated with the cross-correlating dichroic signatures that were previously stored in memory 1304.

Returning to FIG. 5, if it is determined that the unknown analyte signature matches a known signatures (YES at S510), then an indication of the match is provided (S512). For example, as shown in FIG. 13, if there is a "match", controller 1302 then then executes instructions in analyzing program 1306 to display 1312 to display that the unknown analyte is the analyte that is associated with the matching signature in memory 1304.

Returning to FIG. 5, after the indication of the match is provided (S512), process 500 stops (S514). However, if it is determined that the unknown analyte signature does not match a known signature (NO at S510), then an indication of no match is provided (S516).

Returning to FIG. 5, after an indication of no match is provided (S516), process 500 stops (S514). For example, as shown in FIG. 13, if there is no "match", controller 1302 then then executes instructions in analyzing program 1306 to display 1312 to display that the unknown analyte does not match any known analytes.

Related chiral photonic analyzing systems operate with a laser source operating in the ultraviolet spectrum or an incoherent UV light source. These systems, because of the UV laser source, are very expensive.

In accordance with aspects of the present disclosure, a chiral photonic analyzing system uses an IR laser, thus greatly decreasing the system costs. However, a chiral photonic analyzing system in accordance with the present disclosure additionally uses a metamaterial structure, for example and SOI wafer, to act as a resonant cavity to generate $2^{nd}$ and $3^{rd}$ order UV light to generate a dichroic signal of an analyte.

Further, in accordance with aspects of the present disclosure, electrodes are used to generate an electric field at the metamaterial structure to increase the dichroic signal strength. Accordingly, a chiral photonic analyzing system is much less expensive that prior art chiral photonic analyzing systems and provides much more precise delineation of signatures of analytes.

The foregoing description of various embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the embodiments and their practical applications to thereby enable others skilled in the art to best utilize the various embodiments and with various modifications as are suited to the particular use contemplated. It is intended that the scope of the invention be defined by the claims appended hereto.

What is claimed is:

1. A system for use with a randomly dispersed chiral organic solution, said system comprising:
   an infrared (IR) laser configured to output a light beam having a wavelength in an IR spectrum;
   a stage configured to hold the randomly dispersed chiral organic solution, said stage being arranged to receive the light beam from said infrared laser, said stage including a silicon-on-insulator (SOI) resonating cavity structure configured to generate chiral signals in a linear IR regime, said stage being configured to generate a second harmonic optical signal from the light beam, the second harmonic optical signal being in an ultraviolet (UV) spectrum, said stage being configured to output the second harmonic optical signal;
   a UV detector being arranged to receive the second harmonic optical signal from said stage; and
   an analyzer being configured to determine a chiroptical signature for the randomly dispersed chiral organic solution based on the received second harmonic optical signal.

2. The system of claim 1, wherein said IR laser comprises a tunable IR laser configured to output a first light beam of a first wavelength in the IR spectrum at a first time and to output a second light beam of a second wavelength in the IR spectrum at a second time.

3. The system of claim 1, further comprising:
   a second detector being arranged to receive a third harmonic optical signal from said stage,
   wherein said stage is additionally configured to generate a third harmonic optical signal from the light beam, the third harmonic optical signal being in the UV spectrum, said stage being configured to output the third harmonic optical signal, and
   wherein said analyzer is further configured to determine the chiroptical signature for the randomly dispersed chiral organic solution based additionally on the received third harmonic optical signal.

4. The system of claim 1, further comprising:
   an IR detector being arranged to receive an IR optical signal from said stage,
   wherein said analyzer is further configured to determine the chiroptical signature for the randomly dispersed chiral organic solution based additionally on the received IR optical signal.

5. The system of claim 1, further comprising:
   a voltage source,
   wherein said stage comprises an array of unit cells,
   wherein each unit cell comprises: a silicon handle; a silicon electrode; an $SiO_2$ layer disposed between said silicon handle and said silicon electrode; and an electrode separated from said silicon electrode, and
   wherein said voltage source is configured to generate a bias between said silicon electrode and said electrode so as to generate an electric field between said silicon electrode and said electrode so as to elucidate an orientation of a susceptibility tensor of the randomly dispersed chiral organic solution.

6. The system of claim 5,
   wherein said array of unit cells comprises a first unit cell and a second unit cell, and
   wherein said voltage source is configured to generate a first bias having a first polarity between a first silicon electrode and a first electrode of said first unit cell so as to generate a first electric field between said first silicon electrode and said first electrode and is configured to generate a second bias having a second polarity, that is opposite to the first polarity, between a second silicon electrode and a second electrode of said second unit cell so as to generate a second electric field between said second silicon electrode and said second electrode.

7. The system of claim 1, further comprising a controlled polarizer configured to polarize the light beam into a right circular polarization at a first time and to polarize the light beam into a left circular polarization at a second time.

8. A method of analyzing a randomly dispersed chiral organic solution, said method comprising:
   outputting, via an infrared (IR) laser, a light beam having a wavelength in an IR spectrum;
   receiving, via a stage configured to hold the randomly dispersed chiral organic solution, the light beam from the infrared laser, the stage including a silicon-on-insulator (SOI) resonating cavity structure configured to generate chiral signals in a linear IR regime;
   generating, via the stage, a second harmonic optical signal from the light beam, the second harmonic optical signal being in an ultraviolet (UV) spectrum;
   outputting, via the stage, the second harmonic optical signal;
   receiving, via a UV detector, the second harmonic optical signal from the stage; and
   determining, via an analyzer, a chiroptical signature for the randomly dispersed chiral organic solution based on the received second harmonic optical signal.

9. The method of claim 8, wherein said outputting, via the IR laser, the light beam having the wavelength in an IR spectrum comprises:
   outputting, via a tunable IR laser, a first light beam of a first wavelength in the IR spectrum at a first time; and
   outputting, via the tunable IR laser, a second light beam of a second wavelength in the IR spectrum at a second time.

10. The method of claim 8, further comprising:
    generating, via the stage; a third harmonic optical signal from the light beam, the third harmonic optical signal being in the UV spectrum;
    outputting, via the stage, the third harmonic optical signal; and
    receiving, via a second detector, a third harmonic optical signal from the stage,
    wherein said determining, via the analyzer, the chiroptical signature for the randomly dispersed chiral organic solution based on the received second harmonic optical signal comprises determining the chiroptical signature for the randomly dispersed chiral organic solution based additionally on the received third harmonic optical signal.

11. The method of claim 8, further comprising:
    receiving, via an IR detector, an IR optical signal from the stage,
    wherein said determining, via the analyzer, the chiroptical signature for the randomly dispersed chiral organic solution based on the received second harmonic optical signal comprises determining the chiroptical signature for the randomly dispersed chiral organic solution based additionally on the received IR optical signal.

12. The method of claim 8, further comprising:
    generating, via a voltage source, a bias,
    wherein the stage comprises an array of unit cells, wherein each unit cell comprises: a silicon handle; a silicon electrode; an SiO₂ layer disposed between the silicon handle and the silicon electrode; and an electrode separated from the silicon electrode, and wherein said generating, via a voltage source, a bias comprises generating the bias between the silicon electrode and the electrode so as to generate an electric field between the silicon electrode and the electrode so as to elucidate an orientation of a susceptibility tensor of the randomly dispersed chiral organic solution.

13. The method of claim 12, wherein said generating, via a voltage source, a bias comprises generating a first bias and generating a second bias, wherein the array of unit cells comprises a first unit cell and a second unit cell, and wherein said generating the first bias comprises generating the first bias having a first polarity between a first silicon electrode and a first electrode of the first unit cell so as to generate a first electric field between the first silicon electrode and the first electrode, and wherein said generating the second bias comprises generating is configured to generate the second bias having a second polarity, that is opposite to the first polarity, between a second silicon electrode and a second electrode of the second unit cell so as to generate a second electric field between the second silicon electrode and the second electrode.

14. The method of claim 8, further comprising:

polarizing, via a controlled polarizer, the light beam into a right circular polarization at a first time; and polarizing, via the controlled polarizer, the light beam into a left circular polarization at a second time.

15. The method of claim 8, further comprising analyzing, via a controlled analyzer, the light beam into its four stoke components.

16. A non-transitory, computer-readable media having computer-readable instructions stored thereon, the computer-readable instructions being capable of being read by a controller for use with an infrared (IR) laser, a stage, a UV detector, an analyzer, and a randomly dispersed chiral organic solution, wherein the computer-readable instructions are capable of instructing the controller to perform the method comprising:

instructing, via a processor configured to execute instructions stored in a memory, the IR laser to output a light beam having a wavelength in an IR spectrum, so as to cause the stage holding the randomly dispersed chiral organic solution therein, to receive the light beam from the infrared laser, the stage including a silicon-on-insulator (SOI) resonating cavity structure configured to generate chiral signals in a linear IR regime, so as to cause the stage to generate a second harmonic optical signal from the light beam, the second harmonic optical signal being in an ultraviolet (UV) spectrum and to output the second harmonic optical signal; and instructing, via the processor, an analyzer to determine a chiroptical signature for the randomly dispersed chiral organic solution based on the second harmonic optical signal.

17. The non-transitory, computer-readable media of claim 16, wherein the computer-readable instructions are capable of instructing the controller to perform the method, wherein said outputting, via the IR laser, the light beam having the wavelength in an IR spectrum comprises:

outputting, via a tunable IR laser, a first light beam of a first wavelength in the IR spectrum at a first time; and outputting, via the tunable IR laser, a second light beam of a second wavelength in the IR spectrum at a second time.

18. The non-transitory, computer-readable media of claim 16, wherein the computer-readable instructions are capable of instructing the controller to perform the method:

wherein said instructing, via the processor, the IR laser to output the light beam having the wavelength in an IR spectrum, so as to cause the stage holding the randomly dispersed chiral organic solution therein, to generate, via the stage a third harmonic optical signal from the light beam, the third harmonic optical signal being in the UV spectrum, so as to output the third harmonic optical signal, and wherein said instructing, via the processor, the analyzer to determine the chiroptical signature for the randomly dispersed chiral organic solution based on the second harmonic optical signal comprises instructing the analyzer to determine the chiroptical signature for the randomly dispersed chiral organic solution based additionally on the received third harmonic optical signal.

19. The non-transitory, computer-readable media of claim 16, wherein the computer-readable instructions are capable of instructing the controller to perform the method wherein said instructing, via the processor, the analyzer to determine the chiroptical signature for the randomly dispersed chiral organic solution based on the second harmonic optical signal comprises instructing via the analyzer to determine the chiroptical signature for the randomly dispersed chiral organic solution based on additionally on a received IR optical signal.

20. The non-transitory, computer-readable media of claim 16, wherein the computer-readable instructions are capable of instructing the controller to perform the method further comprising:

instructing, via the processor, a voltage source to generate a bias, wherein the stage comprises an array of unit cells, wherein each unit cell comprises: a silicon handle; a silicon electrode; an SiO₂ layer disposed between the silicon handle and the silicon electrode; and an electrode separated from the silicon electrode, and wherein said generating, via a voltage source, a bias comprises generating the bias between the silicon electrode and the electrode so as to generate an electric field between the silicon electrode and the electrode so as to elucidate an orientation of a susceptibility tensor of the randomly dispersed chiral organic solution.

* * * * *